United States Patent
Sasaki et al.

(10) Patent No.: US 10,839,829 B1
(45) Date of Patent: Nov. 17, 2020

(54) MAGNETIC HEAD WITH A MAIN POLE INCLUDING FIRST AND SECOND LAYERS AND MANUFACTURING METHOD FOR THE SAME

(71) Applicants: Yoshitaka Sasaki, Los Gatos, CA (US); Hiroyuki Ito, Milpitas, CA (US); Kazuki Sato, Milpitas, CA (US); Shigeki Tanemura, Milpitas, CA (US); Tetsuya Roppongi, Milpitas, CA (US); Kei Hirata, Milpitas, CA (US); Atsushi Yamaguchi, Milpitas, CA (US); Michitaka Nishiyama, Milpitas, CA (US)

(72) Inventors: Yoshitaka Sasaki, Los Gatos, CA (US); Hiroyuki Ito, Milpitas, CA (US); Kazuki Sato, Milpitas, CA (US); Shigeki Tanemura, Milpitas, CA (US); Tetsuya Roppongi, Milpitas, CA (US); Kei Hirata, Milpitas, CA (US); Atsushi Yamaguchi, Milpitas, CA (US); Michitaka Nishiyama, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 16/585,640

(22) Filed: Sep. 27, 2019

(51) Int. Cl.
*G11B 5/127* (2006.01)
*G11B 5/31* (2006.01)
*G11B 5/66* (2006.01)
*G11B 5/39* (2006.01)
*G11B 5/265* (2006.01)

(52) U.S. Cl.
CPC ......... *G11B 5/3123* (2013.01); *G11B 5/1278* (2013.01); *G11B 5/265* (2013.01); *G11B 5/3912* (2013.01); *G11B 5/66* (2013.01)

(58) Field of Classification Search
CPC ..... G11B 5/1278; G11B 5/3146; G11B 5/315; G11B 2005/0024; G11B 5/3116; G11B 5/3133; G11B 5/147; G11B 5/187
See application file for complete search history.

(56) References Cited

U.S. PATENT DOCUMENTS

| | | | | |
|---|---|---|---|---|
| 7,061,719 B2* | 6/2006 | Matono | ............... | B82Y 10/00 360/125.43 |
| 7,382,574 B2* | 6/2008 | Li | ............... | G11B 5/1278 360/125.08 |
| 8,125,732 B2* | 2/2012 | Bai | ............... | G11B 5/3116 360/125.09 |
| 8,264,792 B2* | 9/2012 | Bai | ............... | G11B 5/1278 360/125.07 |
| 8,320,076 B1* | 11/2012 | Shen | ............... | G11B 5/3116 360/125.04 |
| 8,320,078 B1* | 11/2012 | Zeltser | ............... | G11B 5/1278 360/125.12 |

(Continued)

*Primary Examiner* — Brian E Miller
(74) *Attorney, Agent, or Firm* — Oliff PLC

(57) ABSTRACT

A magnetic head includes a medium facing surface, a coil, a main pole, and a substrate. The main pole includes a first layer, and a second layer lying on the first layer. The first layer includes a thickness-changing portion whose dimension in a direction perpendicular to a top surface of the substrate decreases with decreasing distance to the medium facing surface. At least part of the second layer is located on the thickness-changing portion.

18 Claims, 26 Drawing Sheets

(56) References Cited

U.S. PATENT DOCUMENTS

| | | | |
|---|---|---|---|
| 8,320,079 B2 | 11/2012 | Iwasaki et al. | |
| 8,345,384 B1 * | 1/2013 | Sasaki | G11B 5/1278 360/125.15 |
| 8,385,019 B1 | 2/2013 | Sasaki et al. | |
| 8,427,781 B1 * | 4/2013 | Sasaki | G11B 5/1278 360/125.13 |
| 8,472,137 B2 * | 6/2013 | Hirata | G11B 5/1278 360/125.11 |
| 8,477,452 B2 * | 7/2013 | Sasaki | G11B 5/3116 360/125.13 |
| 8,547,660 B2 * | 10/2013 | Allen | G11B 5/112 360/125.13 |
| 8,582,234 B2 * | 11/2013 | Linville | G11B 5/315 360/125.02 |
| 8,619,390 B2 * | 12/2013 | Cazacu | G11B 5/1278 360/125.06 |
| 8,705,205 B1 * | 4/2014 | Li | G11B 5/1278 360/123.14 |
| 8,797,686 B1 * | 8/2014 | Bai | G11B 5/1278 360/119.03 |
| 8,837,088 B1 * | 9/2014 | Kimura | G11B 5/1278 360/125.3 |
| 8,917,481 B2 | 12/2014 | Kusukawa et al. | |
| 8,941,948 B2 * | 1/2015 | Etoh | G11B 5/23 360/119.03 |
| 9,001,465 B1 * | 4/2015 | Shimizu | G11B 5/53 360/125.3 |
| 9,129,619 B2 * | 9/2015 | Chembrolu | G11B 5/147 |
| 9,230,573 B1 * | 1/2016 | Etoh | G11B 5/39 |
| 9,754,611 B1 * | 9/2017 | Liu | G11B 5/23 |
| 10,032,470 B1 | 7/2018 | Degawa et al. | |
| 10,109,302 B1 | 10/2018 | Shinohara et al. | |
| 2003/0193742 A1 * | 10/2003 | Matono | G11B 5/3116 360/125.06 |
| 2012/0140361 A1 * | 6/2012 | Ota | G11B 19/045 360/294 |
| 2015/0213814 A1 * | 7/2015 | Chembrolu | G11B 5/1278 360/125.12 |
| 2018/0075868 A1 | 3/2018 | Koui et al. | |

* cited by examiner

MAGNETIC HEAD WITH A MAIN POLE INCLUDING FIRST AND SECOND LAYERS AND MANUFACTURING METHOD FOR THE SAME

BACKGROUND OF THE INVENTION

1. Field of the Invention

The present invention relates to a magnetic head used for writing data on a recording medium by means of a perpendicular magnetic recording system, more specifically, to a magnetic head with a main pole including first and second layers and a manufacturing method thereof.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface to face a recording medium. The coil generates a magnetic field corresponding to data to be written on the recording medium. The main pole passes a magnetic flux corresponding to the magnetic field generated by the coil and generates a write magnetic field from the end face.

A magnetic head for use in a magnetic disk drive such as a hard disk drive is typically provided in a slider. The slider has the medium facing surface. The medium facing surface has an air inflow end (a leading end) and an air outflow end (a trailing end). An airflow that comes from the air inflow end into the space between the medium facing surface and the recording medium causes the slider to slightly fly over the surface of the recording medium.

Here, the side of the positions closer to the leading end relative to a reference position will be referred to as the leading side, and the side of the positions closer to the trailing end relative to the reference position will be referred to as the trailing side. The leading side is backward in the direction of travel of the recording medium relative to the slider. The trailing side is forward in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs depending on the position of the magnetic head across the tracks.

Particularly, in a magnetic disk drive of the perpendicular magnetic recording system which is higher in capability of writing on a recording medium than the longitudinal magnetic recording system, the skew mentioned above can induce the phenomenon that signals already written on one or more tracks that are adjacent to a track targeted for writing are erased or attenuated during writing of a signal on the track targeted for writing. In the present application, this phenomenon will be called unwanted erasure. The unwanted erasure includes adjacent track erasure (ATE) and wide-area track erasure (WATE). To achieve higher recording densities, it is necessary to prevent the occurrence of unwanted erasure.

To prevent the occurrence of unwanted erasure induced by a skew and achieve higher recording densities, it is effective to configure the main pole so that the thickness of its portion near the medium facing surface decreases with increasing proximity to the medium facing surface. However, such a configuration makes the main pole small in cross-sectional area near the medium facing surface, and this may result in insufficiency in terms of write characteristics such as overwrite property.

Recently, the use of a spin torque oscillator in a magnetic head has been proposed as a method for increasing the recording density of a magnetic disk drive. U.S. Pat. Nos. 8,320,079 B2, 8,917,481 B2, 10,032,470 B1, and 10,109,302 B1 each disclose a technology of using a spin torque oscillator that generates a microwave magnetic field. According to the technology, a microwave magnetic field is generated by the spin torque oscillator, and the microwave magnetic field and the write magnetic field are simultaneously applied to a portion of the recording medium on which data is to be written. To increase the recording density, it is effective to increase the coercivity of the recording medium by making magnetic fine particles of the recording medium smaller and, at the same time, enhancing the anisotropic energy of the magnetic fine particles. The aforementioned technology enables data writing with the coercivity of the recording medium lowered by microwaves, thus enabling use of a recording medium having high coercivity.

The write head unit may include a trailing shield and a return path section in addition to the coil and the main pole. The trailing shield has a front end face located on the medium facing surface at a forward position relative to the end face of the main pole in the direction of travel of the recording medium. The return path section magnetically connects part of the main pole away from the medium facing surface to the trailing shield. U.S. Patent Application Publication No. 2018/0075868 A1 discloses a technology of using a spin torque oscillator that adjusts permeability. The spin torque oscillator blocks magnetic flux leaking from the main pole to the trailing shield. The technology allows a gap between the main pole and the shield to be smaller, thus making it possible to increase the recording density by steepening the gradient of change in the strength of the write magnetic field.

In both of the two technologies described above, the spin torque oscillator is disposed on the top surface of the main pole. Typically, a spin torque oscillator is formed as follows. A layered film to later become the spin torque oscillator is initially formed on the top surface of the main pole, and then the layered film is patterned by etching so that a plurality of surfaces of the spin torque oscillator other than the top and bottom surfaces are formed in the layered film.

When the layered film is patterned, it is ideal that only the layered film be etched and the main pole remain unetched. In actuality, however, the main pole undergoes etching during patterning of the layered film. This causes the main pole to be small in cross-sectional area near the medium facing surface, thus resulting in the problem of degradation in write characteristics.

SUMMARY OF THE INVENTION

It is an object of the present invention to provide a magnetic head and its manufacturing method that make it possible to prevent degradation of write characteristics due to the structure of the magnetic head.

A magnetic head of the present invention and a magnetic head manufactured by a manufacturing method of the present invention each include: a medium facing surface configured to face a recording medium; a coil configured to generate a magnetic field corresponding to data to be written on the recording medium; a main pole having an end face located on the medium facing surface, the main pole being configured to pass a magnetic flux corresponding to the magnetic field generated by the coil and to generate a write magnetic field for writing data on the recording medium; and a substrate having a top surface. The coil and the main pole are disposed over the top surface of the substrate.

The main pole includes a first layer including the aforementioned end face, and a second layer lying on the first layer. The first layer includes a thickness-changing portion whose dimension in a direction perpendicular to the top surface of the substrate decreases with decreasing distance to the medium facing surface. At least part of the second layer is located on the thickness-changing portion.

In the magnetic head of the present invention, the first layer may have a top surface farthest from the top surface of the substrate. In such a case, the second layer may include a front portion and a rear portion that extend along the top surface of the first layer in respective directions away from the medium facing surface. The rear portion is located farther from the medium facing surface than the front portion. A dimension of the front portion in a first direction orthogonal to the direction in which the front portion extends may increase with increasing distance from the medium facing surface. A maximum dimension of the rear portion in a second direction orthogonal to the direction in which the rear portion extends may be greater than or equal to a maximum dimension of the front portion in the first direction.

In the magnetic head of the present invention, the second layer may have an end located closest to the medium facing surface and at a distance from the medium facing surface. In such a case, the first layer may have a top surface farthest from the top surface of the substrate. The top surface of the first layer may include an inclined portion that is included in the thickness-changing portion of the first layer. The inclined portion may have a rear end located farthest from the medium facing surface, and a front end located opposite to the rear end in the inclined portion. An entirety of the inclined portion may be inclined with respect to the medium facing surface and a direction perpendicular to the medium facing surface such that the rear end is located farther from the top surface of the substrate than the front end. The end of the second layer may be located farther from the medium facing surface than the front end of the inclined portion and closer to the medium facing surface than the rear end of the inclined portion.

When the second layer has the end mentioned above, the magnetic head of the present invention may further include: a trailing shield formed of a magnetic material and having a front end face located on the medium facing surface at a position farther from the top surface of the substrate than the end face of the main pole; and a spin torque oscillator located between the main pole and the trailing shield and electrically connected to the main pole and the trailing shield. In such a case, the first layer may have a top surface farthest from the top surface of the substrate. At least part of the spin torque oscillator may be located on the top surface of the first layer at a position closer to the medium facing surface than the end of the second layer.

When the magnetic head of the present invention includes the trailing shield and the spin torque oscillator, the top surface of the first layer may include an inclined portion that is included in the thickness-changing portion of the first layer. The inclined portion has a rear end located farthest from the medium facing surface, and a front end located opposite to the rear end in the inclined portion. An entirety of the inclined portion may be inclined with respect to the medium facing surface and a direction perpendicular to the medium facing surface such that the rear end is located farther from the top surface of the substrate than the front end. The end of the second layer may be located farther from the medium facing surface than the front end of the inclined portion and closer to the medium facing surface than the rear end of the inclined portion. At least part of the spin torque oscillator may be located on the inclined portion of the top surface of the first layer.

When the top surface of the first layer includes the inclined portion, the top surface of the first layer may further include a stepped portion located closer to the medium facing surface than the inclined portion. The stepped portion may protrude from an imaginary plane including the inclined portion in a direction away from the top surface of the substrate. The spin torque oscillator may be disposed on the stepped portion.

When the top surface of the first layer includes the stepped portion, the magnetic head of the present invention may further include an insulating layer formed of an insulating material and interposed between the spin torque oscillator and the end of the second layer. In such a case, the stepped portion may include a first portion, and a second portion located farther from the medium facing surface than the first portion and closer to the imaginary plane than the first portion. The spin torque oscillator may be disposed on the first portion. The insulating layer may be disposed on the second portion.

A manufacturing method of the magnetic head of the present invention includes the steps of: forming the coil; and forming the main pole. The step of forming the main pole includes the steps of: forming the first layer; and forming the second layer such that at least part of the second layer is located on the thickness-changing portion.

In the manufacturing method of the magnetic head of the present invention, the first layer may have a top surface farthest from the top surface of the substrate. In such a case, the second layer may include a front portion and a rear portion that extend along the top surface of the first layer in respective directions away from the medium facing surface. The rear portion is located farther from the medium facing surface than the front portion. A dimension of the front portion in a first direction orthogonal to the direction in which the front portion extends may increase with increasing distance from the medium facing surface. A maximum dimension of the rear portion in a second direction orthogonal to the direction in which the rear portion extends may be greater than or equal to a maximum dimension of the front portion in the first direction. In such a case, the step of forming the second layer may include the steps of: forming a mask covering a portion near the position at which the medium facing surface is to be formed; forming the second layer with the mask left intact; and lifting off the mask after the second layer is formed.

In the manufacturing method of the magnetic head of the present invention, the second layer may have an end located closest to the medium facing surface and at a distance from the medium facing surface. In such a case, the first layer may have a top surface farthest from the top surface of the substrate. The top surface of the first layer may include an inclined portion that is included in the thickness-changing portion of the first layer. The inclined portion may have a rear end located farthest from the medium facing surface, and a front end located opposite to the rear end in the inclined portion. An entirety of the inclined portion may be inclined with respect to the medium facing surface and a direction perpendicular to the medium facing surface such that the rear end is located farther from the top surface of the substrate than the front end. The end of the second layer may be located farther from the medium facing surface than the front end of the inclined portion and closer to the medium facing surface than the rear end of the inclined portion. In such a case, the step of forming the first layer may include: a step of forming an initial first layer that is to later become the first layer; and an etching step of taper-etching the initial first layer to form the inclined portion in the initial first layer. The initial first layer may become the first layer upon formation of the inclined portion. The step of forming the second layer may be performed after the etching step.

When the second layer has the end mentioned above, the magnetic head may further include: a trailing shield formed of a magnetic material and having a front end face located on the medium facing surface at a position farther from the top surface of the substrate than the end face of the main pole; and a spin torque oscillator located between the main pole and the trailing shield and electrically connected to the main pole and the trailing shield. In such a case, the first layer may have a top surface farthest from the top surface of the substrate. At least part of the spin torque oscillator may be located on the top surface of the first layer at a position closer to the medium facing surface than the end of the second layer. In such a case, the manufacturing method of the magnetic head of the present invention may further include the steps of: forming the spin torque oscillator; and forming the trailing shield after the spin torque oscillator is formed. The step of forming the spin torque oscillator may include: a step of forming a layered film that is to later become the spin torque oscillator; and a patterning step of patterning the layered film by etching to cause the layered film to become the spin torque oscillator.

When the magnetic head includes the trailing shield and the spin torque oscillator, the top surface of the first layer may include an inclined portion that is included in the thickness-changing portion of the first layer. The inclined portion has a rear end located farthest from the medium facing surface, and a front end located opposite to the rear end in the inclined portion. An entirety of the inclined portion may be inclined with respect to the medium facing surface and a direction perpendicular to the medium facing surface such that the rear end is located farther from the top surface of the substrate than the front end. The end of the second layer may be located farther from the medium facing surface than the front end of the inclined portion and closer to the medium facing surface than the rear end of the inclined portion. In such a case, the step of forming the first layer may include: a step of forming an initial first layer that is to later become the first layer; and an etching step of taper-etching the initial first layer to form an inclined surface corresponding to the inclined portion in the initial first layer. The step of forming the second layer may be performed after the etching step.

When the top surface of the first layer includes the inclined portion, at least part of the spin torque oscillator may be located on the inclined portion of the top surface of the first layer. In such a case, the etching step may be a step of forming the inclined portion in the initial first layer. The initial first layer may become the first layer upon formation of the inclined portion. The step of forming the spin torque oscillator may be performed after the step of forming the second layer. The second layer may have a top surface farthest from the top surface of the substrate. The step of forming the layered film may be a step of forming the layered film on the inclined portion and the top surface of the second layer.

When the top surface of the first layer includes the inclined portion, the top surface of the first layer may further include a stepped portion located closer to the medium facing surface than the inclined portion. The stepped portion may protrude from an imaginary plane including the inclined portion in a direction away from the top surface of the substrate. The spin torque oscillator may be disposed on the stepped portion. In such a case, the step of forming the spin torque oscillator may be performed after the etching step and before the step of forming the second layer. The step of forming the layered film may be a step of forming the layered film on the inclined surface formed by the etching step in the initial first layer. The patterning step may be a step of patterning the layered film and etching the initial first layer in succession to the etching of the layered film to thereby form the stepped portion in the initial first layer.

When the top surface of the first layer includes the stepped portion, the magnetic head may further include an insulating layer formed of an insulating material and interposed between the spin torque oscillator and the end of the second layer. In such a case, the stepped portion may include a first portion, and a second portion located farther from the medium facing surface than the first portion and closer to the imaginary plane than the first portion. The spin torque oscillator may be disposed on the first portion. The insulating layer may be disposed on the second portion. In such a case, the manufacturing method of the magnetic head of the present invention may further include the step of forming the insulating layer after the step of forming the spin torque oscillator and before the step of forming the second layer. The step of forming the insulating layer may include the steps of: forming an initial insulating layer of the insulating material; and etching the initial insulating layer to cause the initial insulating layer to become the insulating layer. The patterning step may be a step of patterning the layered film and etching the initial first layer in succession to the etching of the layered film to thereby form the first portion of the stepped portion in the initial first layer. The step of etching the initial insulating layer may be a step of etching the initial insulating layer and etching the initial first layer in succession to the etching of the initial insulating layer to thereby form the inclined portion and the second portion of the stepped portion in the initial first layer. The initial first layer may become the first layer upon formation of the inclined portion and the second portion of the stepped portion.

According to the present invention, the main pole includes the first layer and the second layer, and at least part of the second layer is located on the thickness-changing portion of the first layer. The present invention thereby makes it possible to prevent degradation of write characteristics due to the structure of the magnetic head.

Other objects, features and advantages of the present invention will become fully apparent from the following description.

DETAILED DESCRIPTION OF THE PREFERRED EMBODIMENTS

First Embodiment

Figure 5:
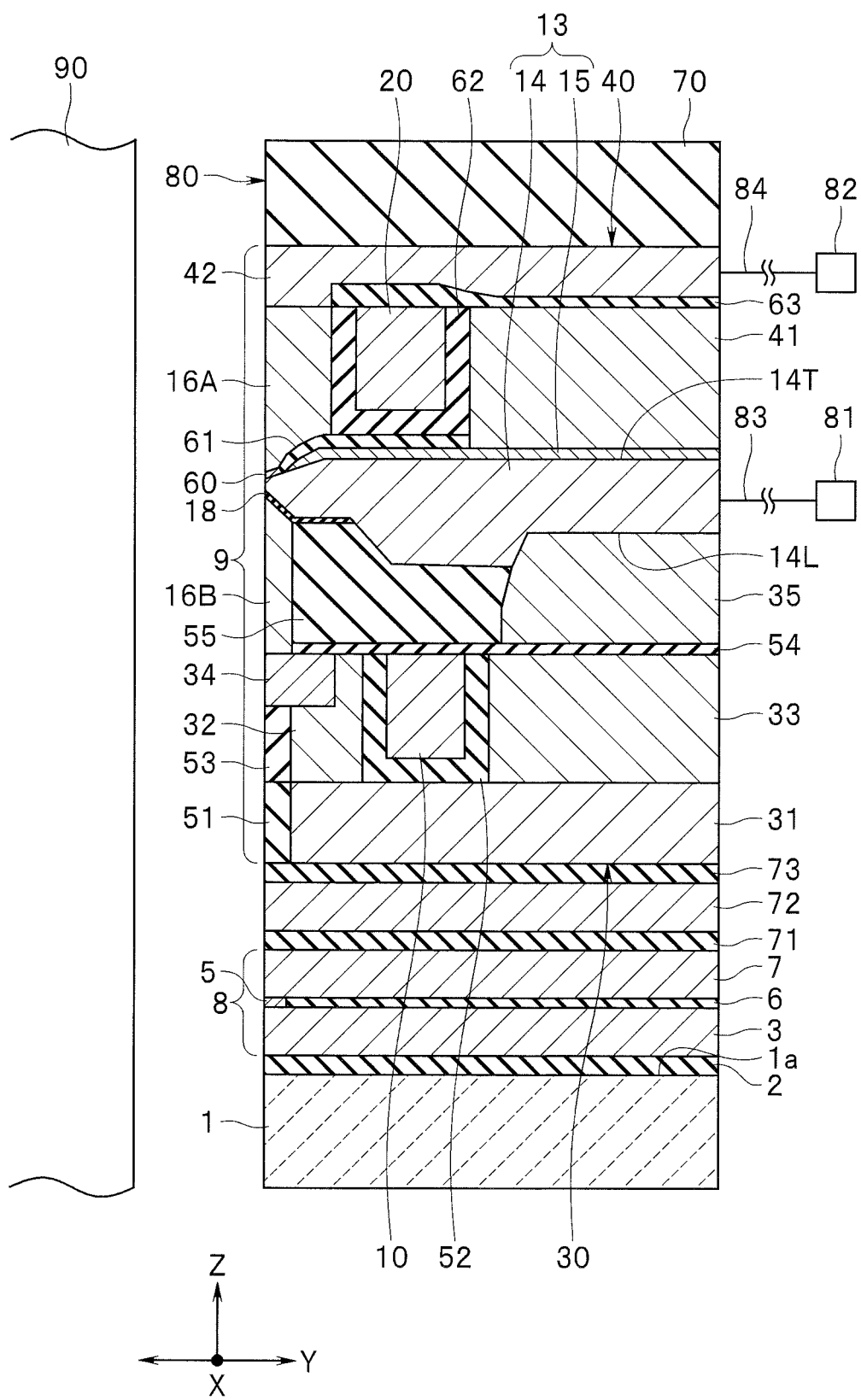
FIG. 5 is a cross-sectional view showing a configuration of the magnetic head according to the first embodiment of the invention.
Figure 6:
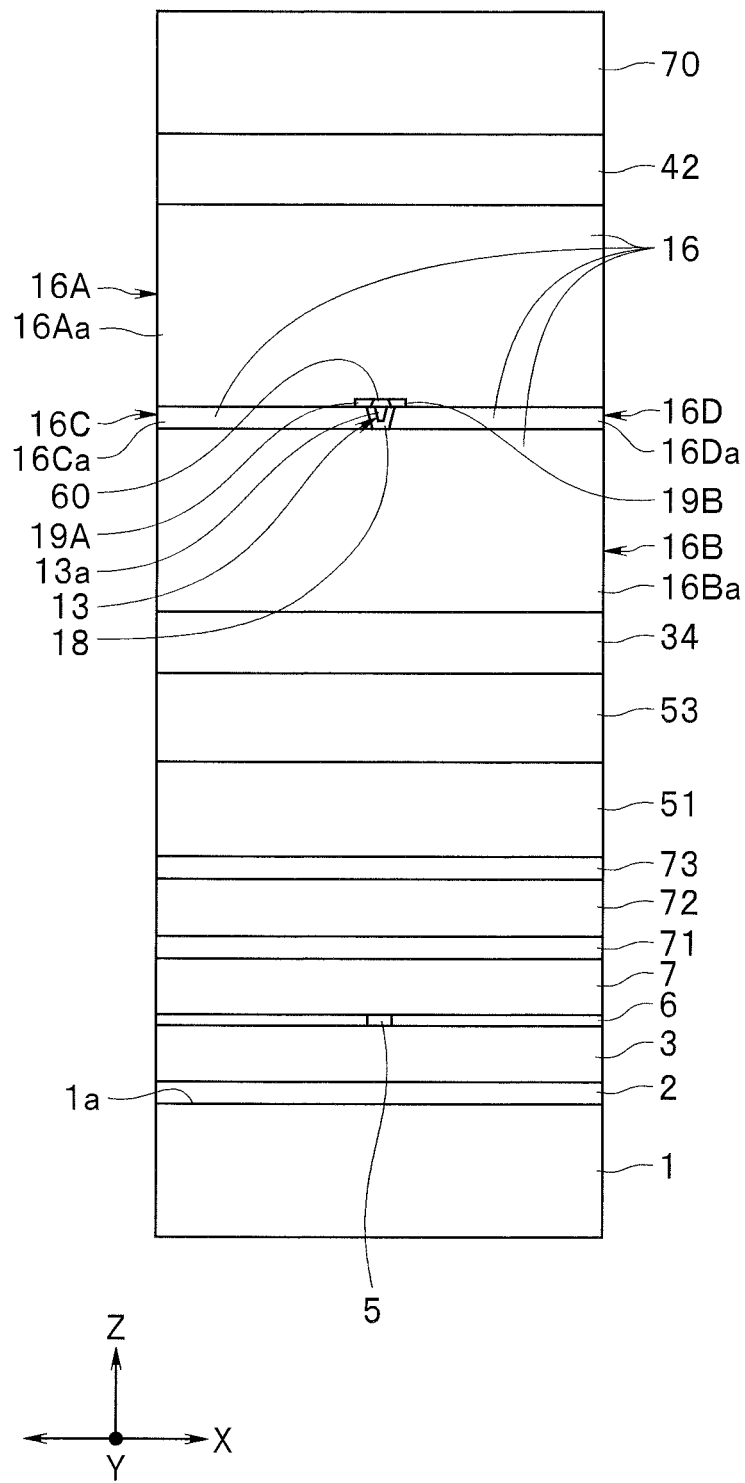
FIG. 6 is a front view showing a medium facing surface of the magnetic head according to the first embodiment of the invention.
Figure 7:
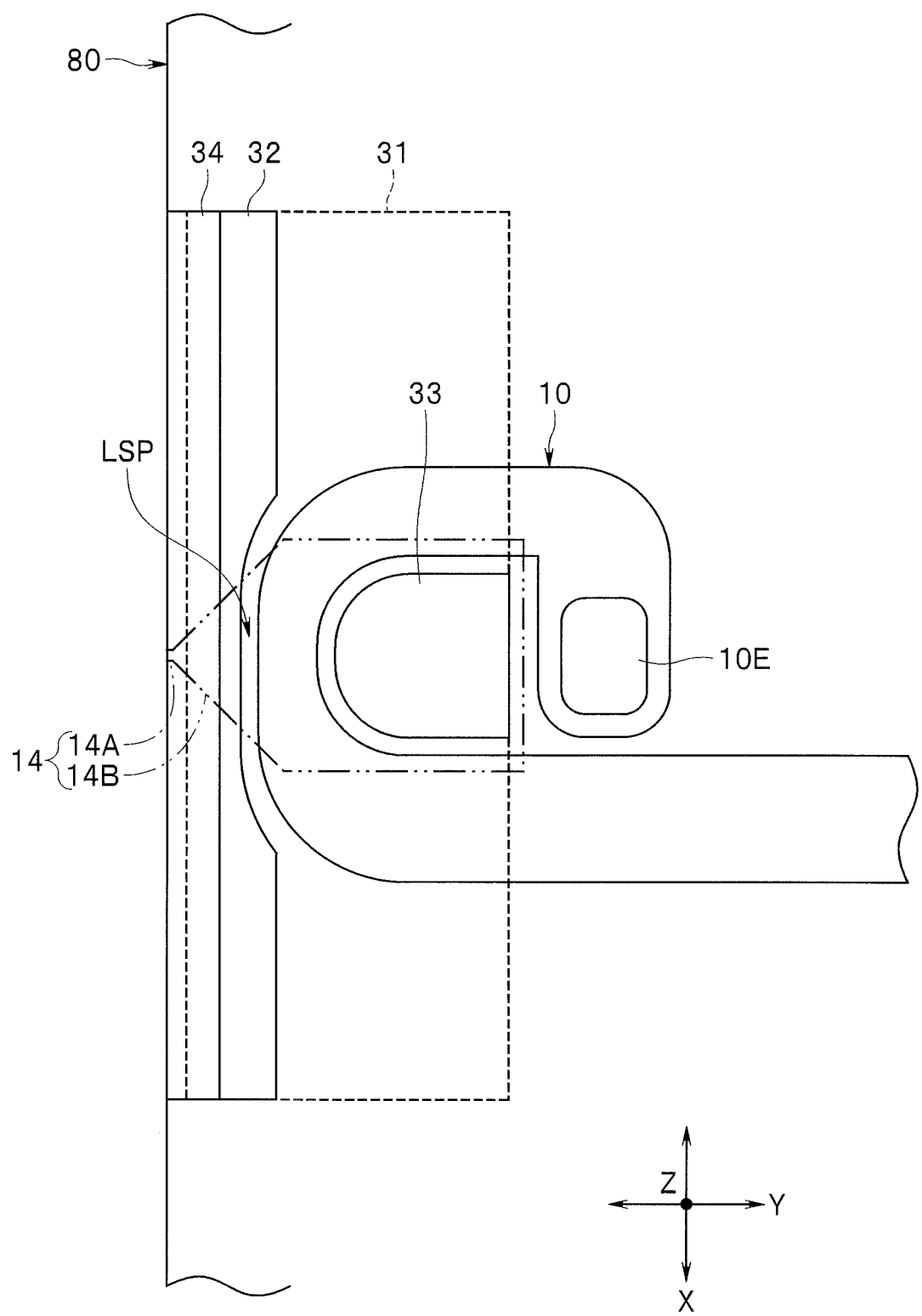
FIG. 7 is a plan view showing a lower coil portion of the magnetic head according to the first embodiment of the invention.
Figure 8:
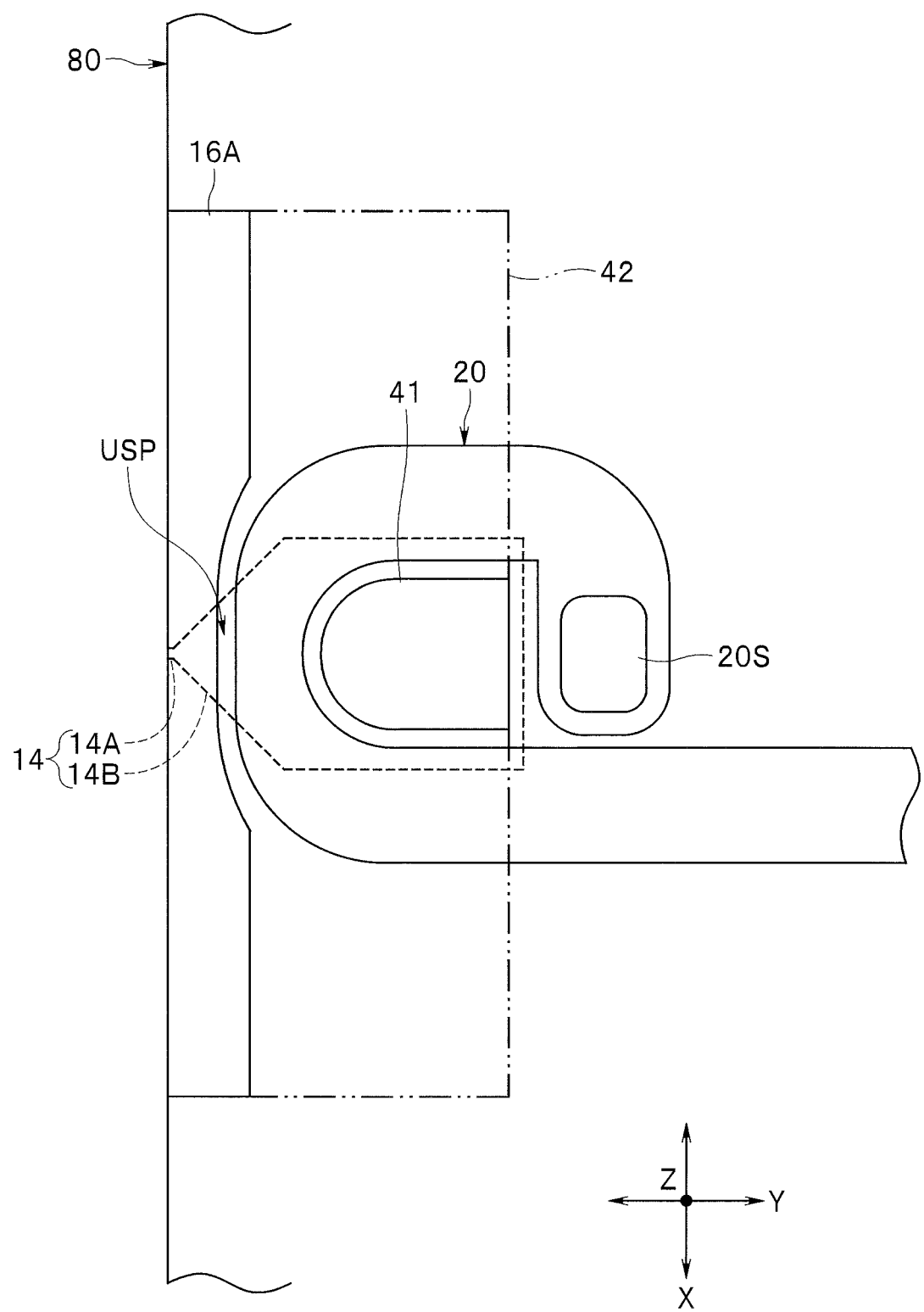
FIG. 8 is a plan view showing an upper coil portion of the magnetic head according to the first embodiment of the invention.

Preferred embodiments of the present invention will now be described in detail with reference to the drawings. First, reference is made to FIG. 5 to FIG. 8 to describe a configuration of a magnetic head according to a first embodiment of the invention. FIG. 5 is a cross-sectional view showing the configuration of the magnetic head. FIG. 6 is a front view showing the medium facing surface of the magnetic head. FIG. 7 is a plan view showing a lower coil portion of the magnetic head. FIG. 8 is a plan view showing an upper coil portion of the magnetic head.

The magnetic head according to the present embodiment is a magnetic head for perpendicular magnetic recording. The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

X, Y, and Z directions are defined here as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 5, the magnetic head has the medium facing surface 80. As shown in FIGS. 5 and 6, the magnetic head includes: a substrate 1 formed of a ceramic material such as aluminum oxide-titanium carbide ($Al_2O_3$-TiC) and having a top surface $1a$; an insulating layer 2 formed of an insulating material such as alumina ($Al_2O_3$) and disposed on the top surface 1a of the substrate 1; a first read shield layer 3 formed of a magnetic material and disposed on the insulating layer 2; a magnetoresistive (MR) element 5 as a read element disposed on the first read shield layer 3; an insulating layer 6 formed of an insulating material and disposed around the MR element 5; and a second read shield layer 7 formed of a magnetic material and disposed on the MR element 5 and the insulating layer 6.

An end of the MR element 5 is located on the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has the function of shielding the MR element 5 from magnetic fields generated in the write head unit 9. The nonmagnetic layers 71 and 73 are formed of alumina, for example.

The write head unit 9 includes a coil, a main pole 13, and a write shield 16. The coil generates a magnetic field corresponding to data to be written on the recording medium 90. The coil includes an upper coil portion 20 and a lower coil portion 10. The upper coil portion 20 and the lower coil portion 10 are each formed of a conductive material such as copper. The upper coil portion 20 and the lower coil portion 10 are connected in series or in parallel. The main pole 13 has an end face 13a located on the medium facing surface 80, and is configured to pass a magnetic flux corresponding to the magnetic field generated by the coil and to generate a write magnetic field for writing data on the recording medium 90 by means of a perpendicular magnetic recording system. FIG. 5 shows a cross section that intersects the end face 13a of the main pole 13 and that is perpendicular to the medium facing surface 80 and to the top surface 1a of the substrate 1.

As shown in FIG. 6, the write shield 16 includes a trailing shield 16A, a leading shield 16B, and two side shields 16C and 16D. The trailing shield 16A is located forward relative to the main pole 13 in the direction of travel of the recording medium 90 (the Z direction). Being located forward relative to the main pole 13 in the direction of travel of the recording medium 90 refers to being located farther from the top surface 1a of the substrate 1 than the main pole 13. The leading shield 16B is located backward relative to the main pole 13 in the direction of travel of the recording medium 90. Being located backward relative to the main pole 13 in the direction of travel of the recording medium 90 refers to being located closer to the top surface 1a of the substrate 1 than the main pole 13. The side shields 16C and 16D are located farther from the top surface 1a of the substrate 1 than the leading shield 16B, opposed to each other in the track width direction (the X direction) with the main pole 13 therebetween, and magnetically couple the trailing shield 16A and the leading shield 16B to each other.

As shown in FIG. 6, the trailing shield 16A has a front end face 16Aa located on the medium facing surface 80. The leasing shield 16B has a front end face 16Ba located on the medium facing surface 80. The side shield 16C has a front end face 16Ca located on the medium facing surface 80. The side shield 16D has a front end face 16Da located on the medium facing surface 80.

The front end face 16Aa is located forward relative to the end face 13a of the main pole 13 in the direction of travel of the recording medium 90. In other words, on the medium facing surface 80 the front end face 16Aa is located farther from the top surface 1a of the substrate 1 than the end face 13a of the main pole 13. The front end face 16Ba is located backward relative to the end face 13a of the main pole 13 in the direction of travel of the recording medium 90. In other words, on the medium facing surface 80 the front end face 16Ba is located closer to the top surface 1a of the substrate 1 than the end face 13a of the main pole 13. The front end faces 16Ca and 16Da are located on opposite sides of the end face 13a of the main pole 13 in the track width direction. On the medium facing surface 80, the front end faces 16Aa, 16Ba, 16Ca and 16Da are arranged to surround the end face 13a of the main pole 13.

The write shield 16 is formed of a magnetic material. For example, CoFeN, CoNiFe, FeNi, or CoFe can be used as the material of the write shield 16.

The write head unit 9 further includes a spin torque oscillator 60. The spin torque oscillator 60 is located between the main pole 13 and the trailing shield 16A in the vicinity of the medium facing surface 80 and electrically connected to the main pole 13 and the trailing shield 16A. The spin torque oscillator 60 may be an element configured to generate a microwave magnetic field or an element configured to adjust a permeability between the main pole 13 and the trailing shield 16A. The configuration of the spin torque oscillator 60 will be described in detail later.

The write head unit 9 further includes an upper return path section 40 and a lower return path section 30. The upper return path section 40 and the lower return path section 30 are each formed of a magnetic material. For example, CoFeN, CoNiFe, FeNi, or CoFe can be used as the material of the upper return path section 40 and the lower return path section 30.

The upper return path section 40 is located forward relative to the main pole 13 in the direction of travel of the recording medium 90, and connects part of the main pole 13 located away from the medium facing surface 80 to the write shield 16, thereby magnetically coupling the main pole 13 to the write shield 16. The upper return path section 40 and the main pole 13 define an upper space USP (see FIG. 8) for a portion of the coil to pass through.

The lower return path section 30 is located backward relative to the main pole 13 in the direction of travel of the recording medium 90, and connects part of the main pole 13 located away from the medium facing surface 80 to the write shield 16, thereby magnetically coupling the main pole 13 to the write shield 16. The lower return path section 30 and the main pole 13 define a lower space LSP (see FIG. 7) for a portion of the coil to pass through.

The lower return path section 30 includes coupling sections 31, 32, 33, 34 and 35. The coupling section 31 is disposed on the nonmagnetic layer 73. The coupling sections 32 and 33 are both disposed on the coupling section 31. The coupling section 32 is located near the medium facing surface 80. The coupling section 33 is located farther from the medium facing surface 80 than the coupling section 32. The coupling sections 31 and 32 have their respective end faces that face toward the medium facing surface 80 and that are each located at a distance from the medium facing surface 80.

As shown in FIG. 7, the lower coil portion 10 is wound around the coupling section 33. The write head unit 9 further includes: an insulating layer 51 formed of an insulating material, lying on the nonmagnetic layer 73 and surrounding the coupling section 31; an insulating film 52 formed of an insulating material and isolating the lower coil portion 10 from the coupling sections 31 to 33; and an insulating layer 53 formed of an insulating material and disposed around the lower coil portion 10 and the coupling section 32. The coupling section 34 is embedded in the coupling section 32 and the insulating layer 53. The coupling section 34 has an end face located on the medium facing surface 80. The top surfaces of the lower coil portion 10, the coupling sections 32 to 34, the insulating film 52 and the insulating layer 53 are even with each other. The insulating layers 51 and 53 and the insulating film 52 are formed of alumina, for example.

The leading shield 16B lies on a portion of the top surface of the coupling section 34. The write head unit 9 further includes an insulating layer 54 formed of an insulating material. The insulating layer 54 lies on another portion of the top surface of the coupling section 34 and on the top surfaces of the lower coil portion 10, the coupling sections 32 and 33, the insulating film 52 and the insulating layer 53. The coupling section 35 lies over the coupling section 33 with the insulating layer 53 interposed therebetween. Note that even if the insulating layer 53 is interposed between the coupling sections 33 and 35, the coupling sections 33 and 35 magnetically couple to each other. The insulating layer 54 is formed of alumina, for example.

The write head unit 9 further includes a nonmagnetic layer 55 formed of a nonmagnetic material. The nonmagnetic layer 55 lies on the insulating layer 54 and surrounds the leading shield 16B and the coupling section 35. The nonmagnetic layer 55 is formed of alumina or silicon oxide ($SiO_2$), for example.

The side shields 16C and 16D are disposed on the leading shield 16B.

The main pole 13 includes a first layer 14 as a main body, and a second layer 15 lying on the first layer 14. The first layer 14 and the second layer 15 are each formed of a ferromagnetic material containing one or more elements selected from Ni, Fe and Co, such as FeNi, CoNiFe, or CoFe.

The first layer 14 has the end face 13a, and also a top surface 14T (see FIG. 5) farthest from the top surface 1a of the substrate 1, a bottom end 14L (see FIG. 5) opposite to the top surface 14T, and a first side surface and a second side surface (see FIGS. 7 and 8) opposite to each other in the track width direction (the X direction). As shown in FIG. 6, the side shield 16C has a first sidewall opposed to a portion of the first side surface of the first layer 14 located near the medium facing surface 80. The side shield 16D has a second sidewall opposed to a portion of the second side surface of the first layer 14 located near the medium facing surface 80.

The write head unit 9 further includes a first gap layer 18 formed of a nonmagnetic material. The first gap layer 18 is disposed along the first and second sidewalls of the side shields 16C and 16D, the top surface of the leading shield 16B and the top surface of the nonmagnetic layer 55. The nonmagnetic material used to form the first gap layer 18 may be, for example, an insulating material such as alumina.

As shown in FIG. 5, the first gap layer 18 is interposed between a portion of the bottom end 14L of the first layer 14 and the top surfaces of the leading shield 16B and the nonmagnetic layer 55. As shown in FIG. 6, the first gap layer 18 is interposed also between the first side surface of the first layer 14 and the first sidewall of the side shield 16C, and between the second side surface of the first layer 14 and the second sidewall of the side shield 16D.

The bottom end 14L of the first layer 14 is in contact with the top surface of the coupling section 35 at a location apart from the medium facing surface 80. The second layer 15 lies on the top surface 14T of the first layer 14 at a location apart from the medium facing surface 80. The shapes and locations of the first layer 14 and the second layer 15 will be described in detail later.

The magnetic head further includes a first nonmagnetic layer (not shown) formed of a nonmagnetic material and disposed around the main pole 13 and the side shields 16C and 16D. The nonmagnetic material used to form the first nonmagnetic layer may be, for example, an insulating material such as alumina.

The spin torque oscillator 60 is disposed on and contacts the top surface 14T of the first layer 14. The spin torque oscillator 60 lies between the medium facing surface 80 and the second layer 15. The end face 13a of the main pole 13 has a side adjacent to the spin torque oscillator 60, the side defining the track width.

The write head unit 9 further includes a second gap layer 19 formed of a nonmagnetic material. The second gap layer 19 includes a first portion 19A and a second portion 19B located on opposite sides of the spin torque oscillator 60 in the track width direction (the X direction). The first portion 19A is located on the side shield 16C and the first gap layer 18. The second portion 19B is located on the side shield 16D and the first gap layer 18. The nonmagnetic material used to form the second gap layer 19 may be, for example, an insulating material such as alumina or silicon oxide.

The write head unit 9 further includes an insulating layer 61 formed of an insulating material and covering a portion of the top surface of the second layer 15. The insulating layer 61 is formed of alumina or silicon oxide, for example. The insulating layer 61 has a maximum thickness (dimension in the Z direction) in the range of, for example, 50 to 150 nm, preferably in the range of 50 to 80 nm.

The trailing shield 16A is disposed on the side shields 16C and 16D, the second gap layer 19, the spin torque oscillator 60 and the insulating layer 61, and in contact with the top surfaces of the side shields 16C and 16D, the second gap layer 19, the spin torque oscillator 60 and the insulating layer 61. On the medium facing surface 80, a portion of the front end face 16Aa of the trailing shield 16A is spaced a predetermined distance away from the end face 13a of the main pole 13. The predetermined distance is preferably in the range of 5 to 60 nm, and may be 30 to 60 nm, for example.

The upper return path section 40 includes coupling sections 41 and 42. The coupling section 41 is at a distance from the medium facing surface 80 and lies on a portion of the top surface of the second layer 15 that is not covered with the insulating layer 61.

As shown in FIG. 8, the upper coil portion 20 is wound around the coupling section 41. The write head unit 9 further includes: an insulating film 62 formed of an insulating material and separating at least part of the upper coil portion 20 from the trailing shield 16A, the coupling section 41 and the insulating layer 61; and a second nonmagnetic layer (not shown) formed of a nonmagnetic material and disposed around the trailing shield 16A, the upper coil portion 20 and the coupling section 41. The insulating film 62 is formed of alumina, for example. The nonmagnetic material used to form the second nonmagnetic layer may be, for example, an insulating material such as alumina.

The write head unit 9 further includes an insulating layer 63 formed of an insulating material and disposed on the upper coil portion 20, the coupling section 41 and the insulating film 62. The insulating layer 63 includes a first portion lying on the upper coil portion 20 and a second portion lying on the coupling section 41. The second portion is smaller in maximum thickness (maximum dimension in the Z direction) than the first portion.

The coupling section 42 is disposed on the trailing shield 16A and the insulating layer 63. The coupling section 42 has an end face located on the medium facing surface 80. The coupling section 42 includes a first portion lying on the trailing shield 16A, a second portion lying over the coupling section 41 with the insulating layer 63 interposed therebetween, and a third portion connecting the first and second portions. Note that even if the insulating layer 63 is interposed between the coupling section 41 and the second portion of the coupling section 42, the coupling sections 41 and 42 magnetically couple to each other.

The magnetic head further includes a protective layer 70 formed of a nonmagnetic material and disposed to cover the write head unit 9. The protective layer 70 is formed of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The write head unit 9 is located forward relative to the read head unit 8 in the direction of travel of the recording medium 90 (the Z direction).

The write head unit 9 includes the coil including the upper coil portion 20 and the lower coil portion 10, the main pole 13, the write shield 16, the first gap layer 18, the second gap layer 19, and the spin torque oscillator 60. The coil, the main pole 13, the write shield 16, the first gap layer 18, the second gap layer 19, and the spin torque oscillator 60 are disposed over the top surface 1a of the substrate 1. The main pole 13 includes the first layer 14 and the second layer 15. The write shield 16 includes the trailing shield 16A, the leading shield 16B, and the side shields 16C and 16D. The second gap layer 19 includes the first portion 19A and the second portion 19B located on opposite sides of the spin torque oscillator 60 in the track width direction.

The write head unit 9 further includes the upper return path section 40 and the lower return path section 30. The upper return path section 40 includes the coupling sections 41 and 42. The lower return path section 30 includes the coupling sections 31, 32, 33, 34, and 35.

The write shield 16 captures a disturbance magnetic field applied to the magnetic head from outside the magnetic head. This can prevent erroneous writing on the recording medium 90 that would be caused by the disturbance magnetic field being intensively captured into the main pole 13. The write shield 16 further has the function of capturing a magnetic flux that is generated from the end face 13a of the main pole 13 and spreads in directions other than the direction perpendicular to the plane of the recording medium 90, and thereby preventing the magnetic flux from reaching the recording medium 90. Furthermore, the write shield 16, the upper return path section 40 and the lower return path section 30 have the function of allowing a magnetic flux that has been generated from the end face 13a of the main pole 13 and has magnetized a portion of the recording medium 90 to flow back.

The spin torque oscillator 60 is electrically connected to the main pole 13 and the trailing shield 16A. As shown in FIG. 5, the magnetic head further includes two terminals 81 and 82 connected to a power source (not shown), wiring 83 for electrically connecting the terminal 81 and the main pole 13, and wiring 84 for electrically connecting the terminal 82 and the coupling section 42. The trailing shield 16A is electrically connected to the coupling section 42. A current for operating the spin torque oscillator 60, which will hereinafter be referred to as a driving current, is supplied via the terminals 81 and 82. The driving current flows through the main pole 13, the spin torque oscillator 60, the trailing shield 16A, and the coupling section 42 in this order.

Figure 4:
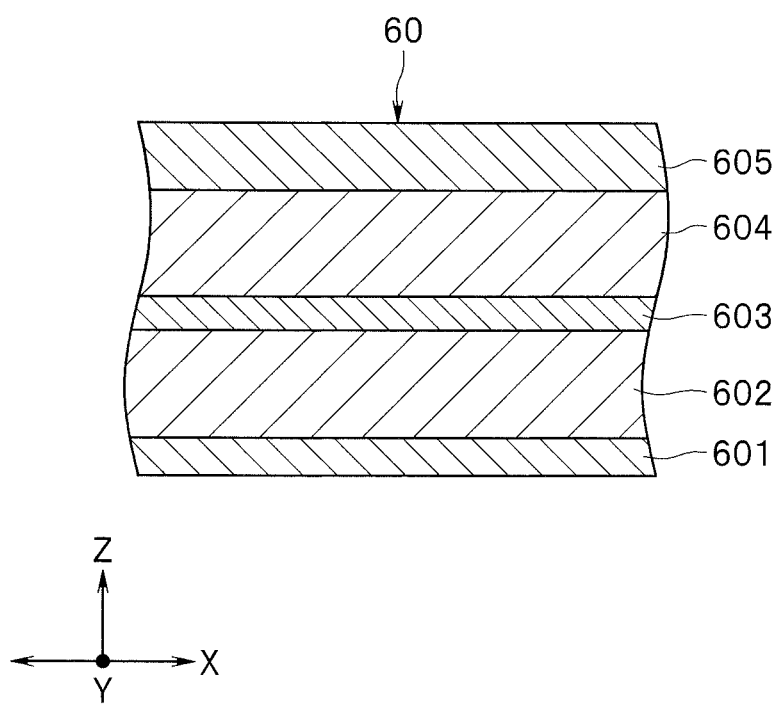
FIG. 4 is a cross-sectional view showing an example of a spin torque oscillator in the magnetic head according to the first embodiment of the invention.

Reference is now made to FIG. 4 to describe a configuration of the spin torque oscillator 60. FIG. 4 is a cross-sectional view showing an example of a configuration of the spin torque oscillator 60. The spin torque oscillator 60 shown in FIG. 4 is one configured to generate a microwave magnetic field. This spin torque oscillator 60 includes an underlayer 601, a magnetic-field generating layer 602, a nonmagnetic layer 603, a spin injection layer 604, and a protective layer 605 stacked in this order, from closest to farthest from the main pole 13.

The underlayer 601 and the protective layer 605 are each formed of a nonmagnetic metal material. For example, the underlayer 601 and the protective layer 605 are each formed of one of Ta, Al, Ti, Mn, Fe, Co, Ni, Cu, Zn, Zr, Nb, Mo, Ru, Rh, Pd, Ag, Hf, W, Ir, Pt, and Au, or an alloy composed of two or more of these elements.

The magnetic-field generating layer 602 is formed of a material whose magnetization direction is parallel or almost parallel to the film plane when no driving current flows. The magnetic-field generating layer 602 may be a magnetic layer formed of one of FeCo, FeCoAl, FeCoSi, FeCoB, and FeNi, a layered film composed of alternately stacked layers of FeCo and Ni, or a layered film composed of alternately stacked layers of Fe and Co.

The nonmagnetic layer 603 is formed of a material having high spin permeability. The nonmagnetic layer 603 may be a nonmagnetic metal layer formed of one of Ag, Au, Cr, and Al, or a tunnel barrier layer formed of MgO or $Al_2O_3$.

The spin injection layer 604 is formed of a material having magnetic anisotropy in a direction perpendicular to the film plane. The spin injection layer 604 may be a layered film composed of alternately stacked layers of CoFe and Ni, a layered film composed of alternately stacked layers of Co and Pt, a layered film composed of alternately stacked layers of Co and Pd, or an alloy layer formed of one of CoPt, FePt, and MnGa.

In the spin torque oscillator 60 shown in FIG. 4, passing a driving current in the direction from the underlayer 601 to the protective layer 605 imparts a spin torque to the magnetization of the magnetic-field generating layer 602 to cause precession of the magnetization of the magnetic-field generating layer 602. As a result, a microwave magnetic field is generated from the magnetic-field generating layer 602.

Figure 1:
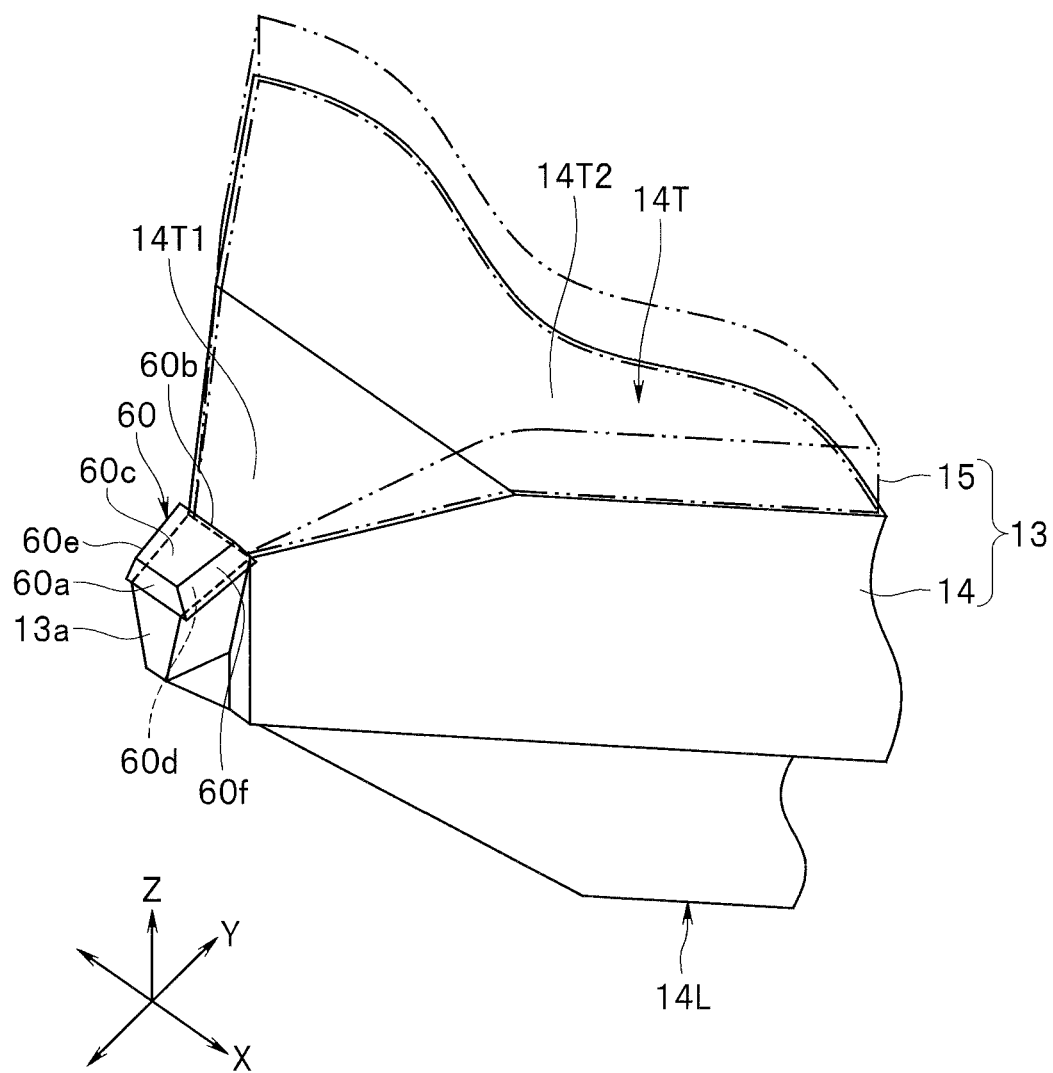
FIG. 1 is a perspective view showing essential parts of a magnetic head according to a first embodiment of the invention.
Figure 2:
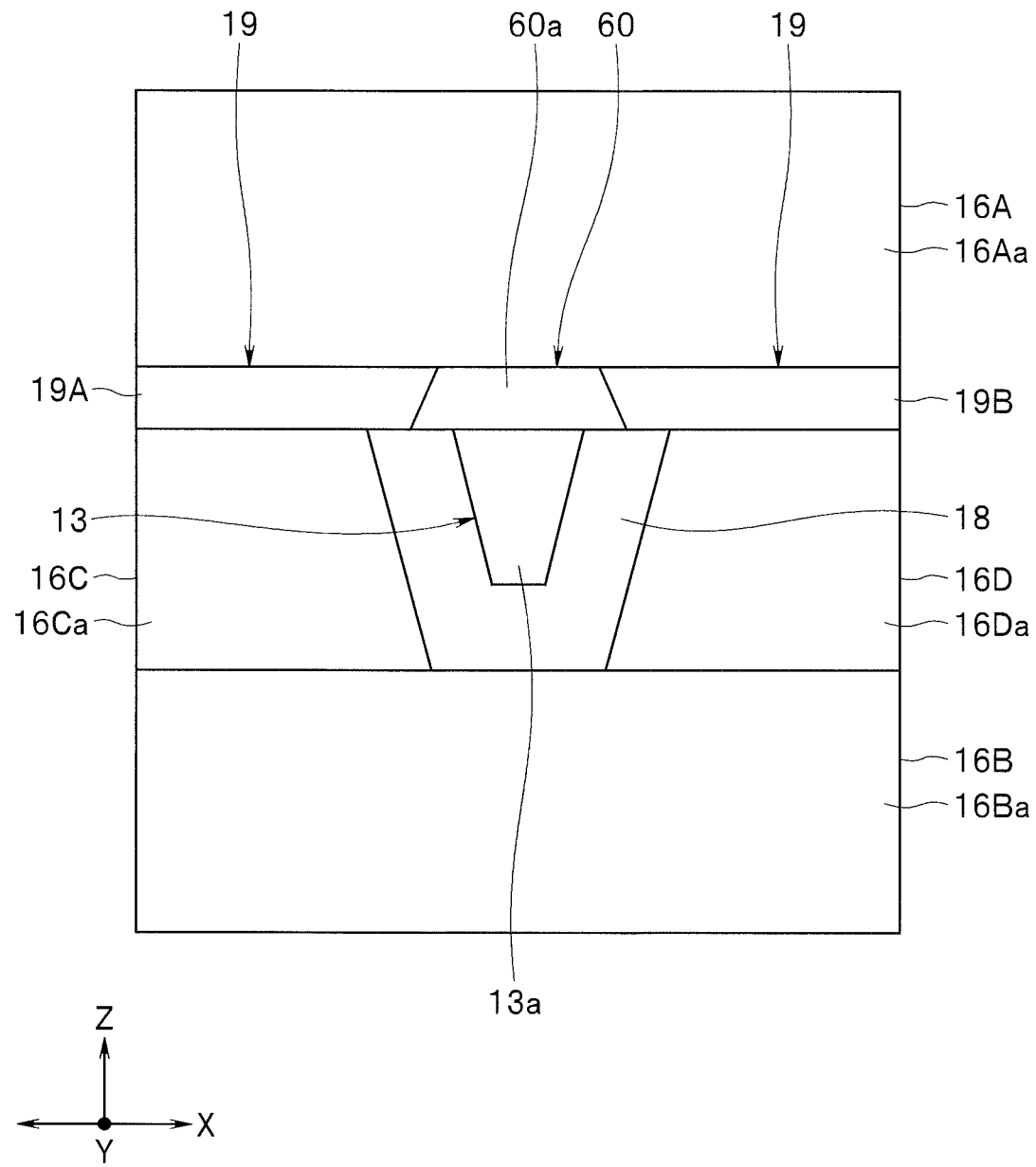
FIG. 2 is a front view showing essential parts of the magnetic head according to the first embodiment of the invention.
Figure 3:
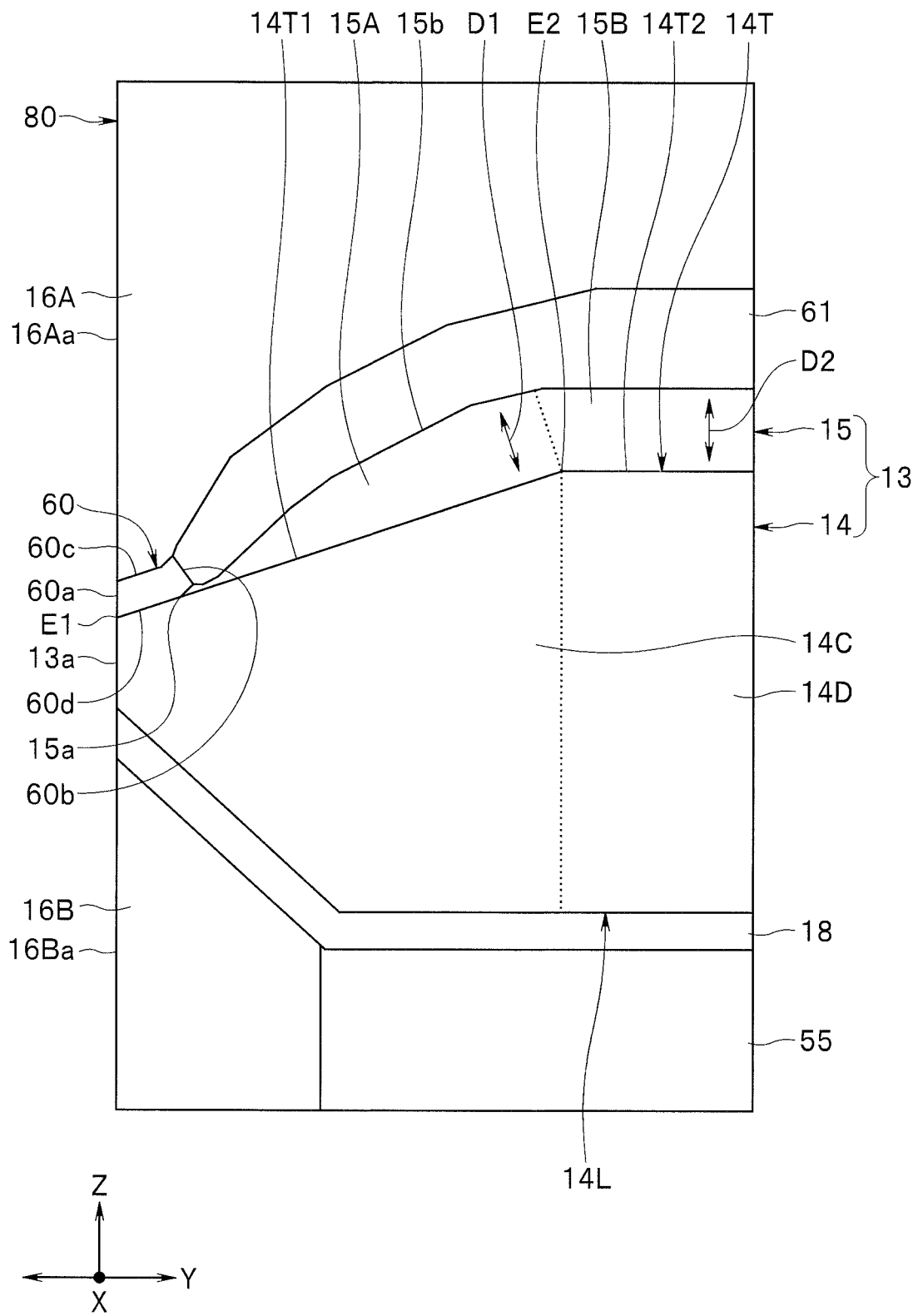
FIG. 3 is a cross-sectional view showing essential parts of the magnetic head according to the first embodiment of the invention.

Now, the shapes and layout of the main pole 13 and the spin torque oscillator 60 will be described in detail with reference to FIG. 1 to FIG. 3, FIG. 5, FIG. 7 and FIG. 8. FIG. 1 is a perspective view showing essential parts of the magnetic head. FIG. 2 is a front view showing essential parts of the magnetic head. FIG. 3 is a cross-sectional view showing essential parts of the magnetic head.

As shown in FIG. 2, the end face 13a of the main pole 13 has a top edge farthest from the top surface 1a of the substrate 1, a first side edge connected to one end of the top edge, and a second side edge connected the other end of the top edge. In the present embodiment, specifically, the top edge is in contact with the spin torque oscillator 60. The top edge defines the track width. The position of an end of a recording bit to be recorded on the recording medium 90 is determined by the position of the top edge. The width in the track width direction of the end face 13a of the main pole 13 decreases with increasing distance from the top edge, i.e., with decreasing distance to the top surface 1a of the substrate 1. Each of the first side edge and the second side edge forms an angle in the range of, for example, 7° to 17°, preferably 10° to 15°, with respect to a direction perpendicular to the top surface 1a of the substrate 1. The top edge has a length in the range of 0.05 to 0.20 µm, for example.

As shown in FIG. 7 and FIG. 8, the first layer 14 of the main pole 13 includes a track width defining portion 14A having the first end face 13a and an end opposite thereto, and a wide portion 14B connected to the end of the track width defining portion 14A. The first layer 14 has the top surface 14T, the bottom end 14L, the first side surface and the second side surface described previously. Hereinafter, a width in the track width direction (the X direction) will be simply referred to as a width. The width of the top surface 14T is greater in the wide portion 14B than in the track width defining portion 14A. The width of the top surface 14T in the track width defining portion 14A gradually increases with increasing distance from the medium facing surface 80, and then becomes constant.

As shown in FIG. 3, the first layer 41 includes a thickness-changing portion 14C whose dimension in a direction perpendicular to the top surface 1a of the substrate 1 decreases with decreasing distance to the medium facing surface 80, and a portion 14D other than the thickness-changing portion 14C. In FIG. 3 the boundary between the thickness-changing portion 14C and the portion 14D is indicated by a dotted line. In the present embodiment, specifically, the thickness-changing portion 14C includes the end face 13a and is located closer to the medium facing surface 80 than the portion 14D. A cross-sectional area of the thickness-changing portion 14C in a cross section parallel to the medium facing surface 80 decreases with decreasing distance to the medium facing surface 80. A cross-sectional area of the portion 14D in a cross section parallel to the medium facing surface 80 is greater than or equal to the cross-sectional area of the thickness-changing portion 14C in the cross section parallel to the medium facing surface 80. The thickness-changing portion 14C has a maximum thickness (dimension in the Z direction) in the range of, for example, 240 to 320 nm.

At least part of the second layer 15 of the main pole 13 is located on the thickness-changing portion 14C. In the present embodiment, a portion of the second layer 15 is located on the thickness-changing portion 14C, and the remainder of the second layer 15 is located on the portion 14D.

As shown in FIG. 1 and FIG. 3, the top surface 14T includes an inclined portion 14T1 included in the thickness-changing portion 14C of the first layer 14. The inclined portion 14T1 has a rear end E2 located farthest from the medium facing surface 80, and a front end E1 located opposite to the rear end E2 in the inclined portion 14T1. In the present embodiment, the front end E1 is specifically located on the medium facing surface 80. An entirety of the inclined portion 14T1 is inclined with respect to the medium facing surface 80 and a direction perpendicular to the medium facing surface 80 such that the rear end E2 is located farther from the top surface 1a of the substrate 1 than the front end E1.

The top surface 14T further includes a flat portion 14T2 connected to the rear end E2 of the inclined portion 14T1. The flat portion 14T2 extends substantially in a direction perpendicular to the medium facing surface 80 (the Y direction).

As shown in FIG. 3, the bottom end 14L includes a first inclined portion and a first flat portion, the first inclined portion being closer to the medium facing surface 80 than the first flat portion. The first inclined portion has a first end located on the medium facing surface 80, and a second end opposite thereto. The second inclined portion may be an edge formed by two intersecting surfaces, or may be a surface connecting two surfaces to each other. The first flat portion is a surface connected to the second end of the first inclined portion. The first inclined portion is inclined such that the second end is located backward relative to the first end in the direction of travel of the recording medium 90 (the Z direction). The first flat portion extends substantially in a direction perpendicular to the medium facing surface 80 (the Y direction).

As shown in FIG. 5, the bottom end 14L further includes a second inclined portion and a second flat portion. The second inclined portion is a surface connected to the first flat portion. The second flat portion is a surface connected to an end of the second inclined portion, the end being opposite from the first flat portion. The second inclined portion is inclined similarly to the first inclined portion. The second flat portion extends substantially in a direction perpendicular to the medium facing surface 80 (the Y direction), like the first flat portion.

As shown in FIG. 3, the second layer 15 of the main pole 13 has an end 15a located closest to the medium facing surface 80 and at a distance from the medium facing surface 80, and a top surface 15b farthest from the top surface 1a of the substrate 1. The end 15a of the second layer 15 is located farther from the medium facing surface 80 than the front end E1 of the inclined portion 14T1 of the top surface 14T of the first layer 14, and closer to the medium facing surface 80 than the rear end E2 of the inclined portion 14T1 of the top surface 14T of the first layer 14. The distance from the end 15a of the second layer 15 to the medium facing surface 80 falls within the range of 20 to 100 nm, for example.

As shown in FIG. 3, the second layer 15 includes a front portion 15A and a rear portion 15B that extend along the top surface 14T of the first layer 14 in respective directions away from the medium facing surface 80. The front portion 15A includes the end 15a of the second layer 15. The rear portion 15B is located farther from the medium facing surface 80 than the front portion 15A. In FIG. 3 the boundary between the front portion 15A and the rear portion 15B is indicated by a dotted line.

A direction orthogonal to the direction in which the front portion 15A extends will be referred to as a first direction, and denoted by the symbol D1. A direction orthogonal to the direction in which the rear portion 15B extends will be referred to as a second direction, and denoted by the symbol D2. The dimension of the front portion 15A in the first direction D1, i.e., the thickness of the front portion 15A, increases with increasing distance from the medium facing surface 80. The maximum dimension of the rear portion 15B in the second direction D2 is greater than or equal to the maximum dimension of the front portion 15A in the first direction. In other words, the maximum thickness of the rear portion 15B is greater than or equal to the maximum thickness of the front portion 15A. In the example shown in FIG. 3, the thickness of the rear portion 15B is constant regardless of the distance from the medium facing surface 80. The thickness of the rear portion 15B falls within the range of 50 to 150 nm, for example.

At least part of the spin torque oscillator 60 is located on the top surface 14T of the first layer 14 at a position closer to the medium facing surface 80 than the end 15a of the second layer 15, in other words, on the inclined portion 14T1 of the top surface 14T of the first layer 14. In the present embodiment, as shown in FIG. 1 and FIG. 3, most part of the spin torque oscillator 60 is located on the inclined portion 14T1, and the remainder of the spin torque oscillator 60 is located on the top surface 15b of the second layer 15. The dimension of the spin torque oscillator 60 in a direction perpendicular to the medium facing surface 80 (the Y direction) falls within the range of 20 to 40 nm, for example.

As shown in FIG. 1 to FIG. 3, the spin torque oscillator 60 has a front end face 60a facing the medium facing surface 80, a rear end face 60b farthest from the medium facing surface 80, a top surface 60c farthest from the top surface 1a of the substrate 1, a bottom surface 60d closest to the top surface 1a of the substrate 1, and a first side surface 60e and a second side surface 60f opposite to each other in the track width direction (the X direction). In the example shown in FIG. 1 to FIG. 3, the front end face 60a is located on the medium facing surface 80. The insulating layer 61 has an end closest to the medium facing surface 80, and the end is in contact with the rear end face 60b. The top surface 60c is in contact with the trailing shield 16A. The bottom surface 60d is in contact with the inclined portion 14T1 of the top surface 14T of the first layer 14.

Reference is now made to FIG. 7 and FIG. 8 to describe the connection relationship between the upper coil portion 20 and the lower coil portion 10 of the coil. As shown in FIG. 7, the lower coil portion 10 has a coil connection 10E electrically connected to the upper coil portion 20. As shown in FIG. 8, the upper coil portion 20 has a coil connection 20S electrically connected to the coil connection 10E of the lower coil portion 10. The coil connection 20S is electrically connected to the coil connection 10E via a first and a second connection layer of columnar shape (not illustrated) that penetrate a plurality of layers interposed between the upper coil portion 20 and the lower coil portion 10. The first and second connection layers are stacked in this order on the coil connection 10E. The coil connection 20S lies on the second connection layer. The first and second connection layers are formed of a conductive material such as copper. In the example shown in FIG. 7 and FIG. 8, the upper coil portion 20 and the lower coil portion 10 are connected in series.

Next, a description will be given of the unique function and effect of the magnetic head according to the present embodiment. In the present embodiment, the first layer 14 of the main pole 13 includes the thickness-changing portion 14C whose dimension in a direction perpendicular to the top surface 1a of the substrate 1 decreases with decreasing distance to the medium facing surface 80. The thickness-changing portion 14C includes the end face 13a of the main pole 13 and lies near the medium facing surface 80. The second layer 15 of the main pole 13 lies on the thickness-changing portion 14C. By virtue of this, the present embodiment allows the main pole 13 to be larger in the area of a cross section (hereinafter simply referred to as a cross-sectional area) parallel to the medium facing surface 80 at a location near the medium facing surface 80, compared to a case where the main pole 13 consists only of the first layer 14. According to the present embodiment, it is thereby possible to prevent degradation of write characteristics due to the structure of the magnetic head.

In the present embodiment, the second layer 15 includes the front portion 15A and the rear portion 15B. The dimension of the front portion 15A in the first direction D1 orthogonal to the direction in which the front portion 15A extends increases with increasing distance from the medium facing surface 80. The maximum dimension of the rear portion 15B in the second direction D2 orthogonal to the direction in which the rear portion 15B extends is greater than or equal to the maximum dimension of the front portion 15A in the first direction D1. By virtue of this, the present embodiment makes it possible to increase the cross-sectional area of a portion of the main pole 13 away from the medium facing surface 80 to thereby allow the main pole 13 to direct a larger amount of magnetic flux to the medium facing surface 80.

In the present embodiment, the second layer 15 has the end 15a located closest to the medium facing surface 80 and at a distance from the medium facing surface 80. A smaller distance from the end 15a of the second layer 15 to the medium facing surface 80 contributes to better write characteristics. To provide improved write characteristics, the distance from the end 15a of the second layer 15 to the medium facing surface 80 is preferably 60 nm or smaller, more preferably, 40 nm or smaller. In the present embodiment, the distance from the end 15a of the second layer 15 to the medium facing surface 80 is almost equal to the dimension of the spin torque oscillator 60 in a direction perpendicular to the medium facing surface 80 (the Y direction). A mentioned previously, the dimension of the spin torque oscillator 60 in the foregoing direction is relatively small, falling within the range of, for example, 20 to 40 nm. The present embodiment thus provides improved write characteristics by allowing the end 15a of the second layer 15 to be located at a small distance from the medium facing surface 80.

In the present embodiment, the top surface 14T of the first layer 14 includes the inclined portion 14T1. The end 15a of the second layer 15 is located farther from the medium facing surface 80 than the front end E1 of the inclined portion 14T1 and closer to the medium facing surface 80 than the rear end E2 of the inclined portion 14T1. The present embodiment thereby allows a portion of the main pole 13 including the inclined portion 14T1 to be larger in cross-sectional area than in the case where the main pole 13 consists only of the first layer 14.

In the present embodiment, the magnetic head includes the spin torque oscillator 60. The magnetic head can provide a higher recording density by application of a higher voltage to the spin torque oscillator 60. However, an excessive increase in the voltage applied to the spin torque oscillator 60 can cause the spin torque oscillator 60 to generate heat, resulting in shortening of the life of the magnetic head. According to the present embodiment, as described above, the main pole 13 has a large cross-sectional area near the medium facing surface 80 by virtue of the second layer 15. When compared for the same recording density, the voltage to be applied to the spin torque oscillator 60 can thus be lower in the present embodiment than in the case where the main pole 13 consists only of the first layer 14. The present embodiment thus makes it possible to prevent the life of the magnetic head from being shortened.

A manufacturing method of the magnetic head according to the present embodiment will now be described. The manufacturing method of the magnetic head according to the present embodiment starts with forming the insulating layer 2, the first read shield layer 3, and the MR element 5 in this order on the substrate 1, as shown in FIG. 5 and FIG. 6. Next, the insulating layer 6 is formed around the MR element 5. The second read shield layer 7, the nonmagnetic layer 71, the middle shield layer 72 and the nonmagnetic layer 73 are then formed in this order over the MR element 5 and the insulating layer 6.

Next, the coupling section 31 is formed on the nonmagnetic layer 73 by frame plating, for example. Then, the insulating layer 51 is formed over the entire top surface of the stack. The insulating layer 51 is then polished by, for example, chemical mechanical polishing (hereinafter referred to as CMP), until the coupling section 31 is exposed. Next, the coupling sections 32 and 33 are formed on the coupling section 31 by frame plating, for example. The insulating film 52 is then formed over the entire top surface of the stack. Next, the lower coil portion 10 is formed by frame plating, for example. The insulating layer 53 is then formed over the entire top surface of the stack. The insulating film 52 and the insulating layer 53 are then polished by, for example, CMP, until the lower coil portion 10 and the coupling sections 32 and 33 are exposed.

Next, the coupling section 32 and the insulating layer 53 are etched to form therein an accommodation section to accommodate the coupling section 34. Then, the coupling section 34 is formed to be accommodated in the accommodation section. The insulating layer 54 is then formed over the entire top surface of the stack. Next, the insulating layer 54 is selectively etched to form therein a first opening for exposing the top surface of the coupling section 34 and a second opening for exposing the coil connection 10E (see FIG. 7) of the lower coil portion 10. Then, the leading shield 16B is formed on the coupling section 34 at the position of the first opening, the coupling section 35 is formed on a portion of the insulating layer 54 covering the top surface of the coupling section 33, and the first connection layer (not shown) is formed on the coil connection 10E at the position of the second opening, by performing frame plating, for example.

Next, the nonmagnetic layer 55 is formed over the entire top surface of the stack. The nonmagnetic layer 55 is then polished by, for example, CMP, until the leading shield 16B, the coupling section 35 and the first connection layer are exposed. Then, the leading shield 16B and the nonmagnetic layer 55 are taper-etched in part by, for example, ion beam etching (hereinafter referred to as IBE) to so as to provide the top surface of the leading shield 16B with a portion opposed to the first inclined portion (see FIG. 2) of the bottom end 14L of the main pole 13 to be formed later, and provide the top surface of the nonmagnetic layer 55 with a portion opposed to the second inclined portion (see FIG. 5) of the bottom end 14L of the main pole 13 to be formed later. In this etching, the coupling section 35 and the first connection layer are also etched in part.

Next, the side shields 16C and 16D are formed on the leading shield 16B by, for example, frame plating. The first gap layer 18 is then formed to cover the leading shield 16B and the side shields 16C and 16D. When alumina is used as the material of the first gap layer 18, the first gap layer 18 is formed by atomic layer deposition (herein after referred to as ALD). The first gap layer 18 is then selectively etched to form therein an opening for exposing the top surface of the coupling section 35, and an opening for exposing the top surface of the first connection layer. Next, an initial first layer, which is to become the first layer 14 of the main pole 13 later, and the second connection layer (not shown) are formed by frame plating, for example. The initial first layer and the second connection layer are formed such that their top surfaces are higher in level than portions of the first gap layer 18 that are located on the side shields 16C and 16D.

Next, the first nonmagnetic layer (not shown) is formed over the entire top surface of the stack. The initial first layer, the second connection layer, the first gap layer 18 and the first nonmagnetic layer are then polished by, for example, CMP until the side shields 16C and 16D are exposed.

Reference is now made to FIG. 9 to FIG. 18 to describe a series of steps to be performed after the foregoing step up to the formation of the trailing shield 16A and the coupling section 41. FIG. 9 to FIG. 18 each illustrate a stack of layers formed in the process of manufacturing the magnetic head. FIG. 9 to FIG. 18 omit the illustration of portions that are closer to the substrate 1 relative to the leading shield 16B and the nonmagnetic layer 55. FIGS. 9, 10 and FIGS. 16 to 18 each illustrate a cross section perpendicular to the medium facing surface 80 and to the top surface 1a of the substrate 1. In FIGS. 9, 10 and FIGS. 16 to 18, the symbol ABS represents the position where the medium facing surface 80 is to be formed. FIG. 11 to FIG. 15 each illustrate a cross section of the stack taken at the position ABS where the medium facing surface 80 is to be formed.

Figure 9:
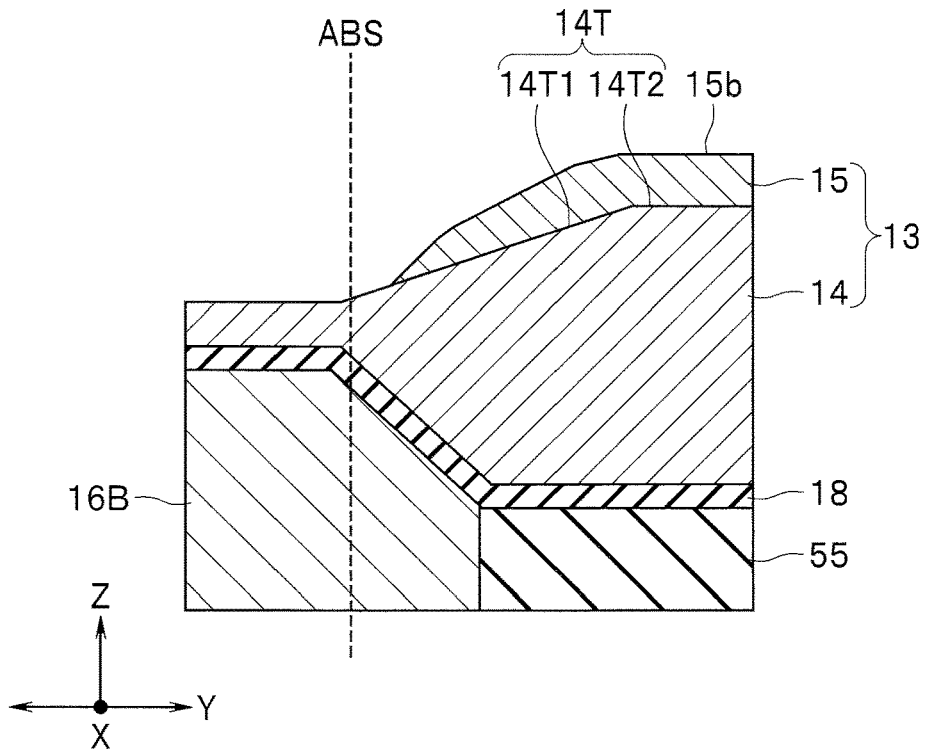
FIG. 9 is a cross-sectional view showing a step of a manufacturing method of the magnetic head according to the first embodiment of the invention.

FIG. 9 shows a step following the polishing of the first nonmagnetic layer. In this step, an etching step is performed first. In the etching step, the initial first layer is taper-etched by, for example, IBE to form an inclined surface corresponding to the inclined portion 14T1 of the top surface 14T of the first layer 14 in the initial first layer. In the present embodiment, the etching step is specifically the step of forming the inclined portion 14T1 in the initial first layer. The initial first layer becomes the first layer 14 upon formation of the inclined portion 14T1. A portion of the top surface of the initial first layer that remains after the etching becomes the flat portion 14T2. In the etching step, the side shields 16C and 16D, the first gap layer 18 and the first nonmagnetic layer are also etched in part.

Next, a mask (not shown) is formed on the first layer 14. The mask is formed by patterning a photoresist layer. The mask covers a portion of the top surface 14T of the first layer 14 near the position ABS where the medium facing surface 80 is to be formed. Next, with the mask left intact, the second layer 15 of the main pole 13 is formed by, for example, ion beam deposition (hereinafter referred to as IBD) or sputtering. As a result, a portion of the second layer 15 near the mask, i.e., near the position ABS where the medium facing surface 80 is to be formed, becomes small in thickness, whereas a portion of the second layer 15 away from the mask, i.e., away from the position ABS where the medium facing surface 80 is to be formed, is large in thickness. This makes it possible to form the front portion 15A and the rear portion 15B shown in FIG. 3. The mask is then lifted off.

Figure 10:
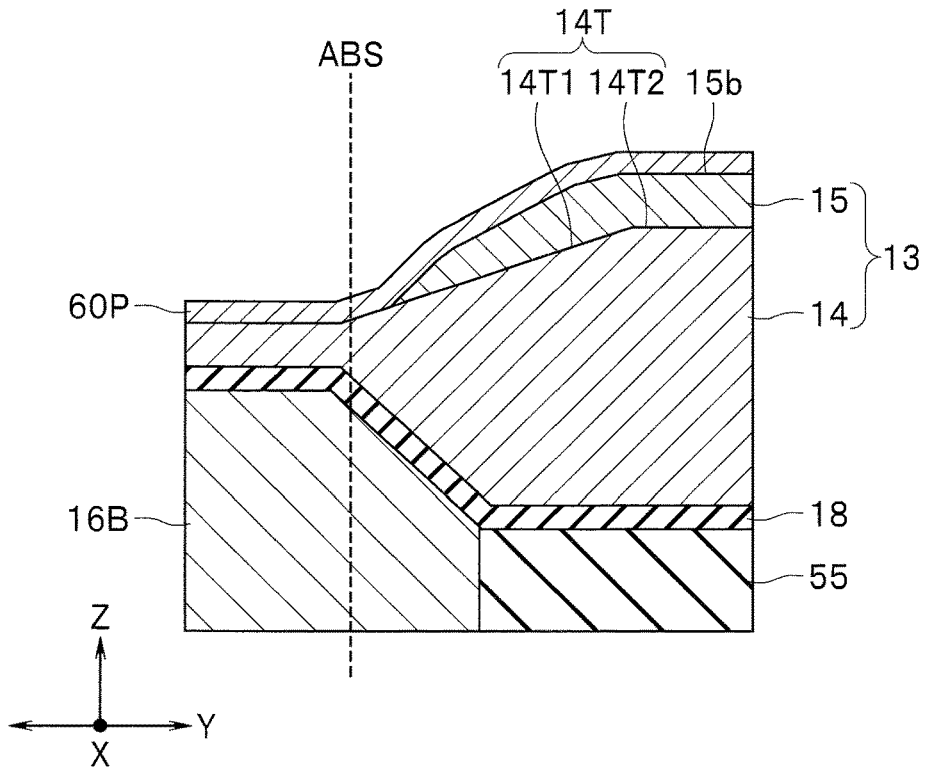
FIG. 10 is a cross-sectional view showing a step that follows the step shown in FIG. 9.

FIG. 10 shows the next step. This step forms a layered film 60P, which is to later become the spin torque oscillator 60, on the stack including the main pole 13. The layered film 60P is formed on the inclined portion 14T1 of the top surface 14T of the first layer 14 and the top surface 15b of the second layer 15. As in the example shown in FIG. 4, the spin torque oscillator 60 is composed of a plurality of layers. The layered film 60P includes all the layers to constitute the spin torque oscillator 60.

Figure 11:
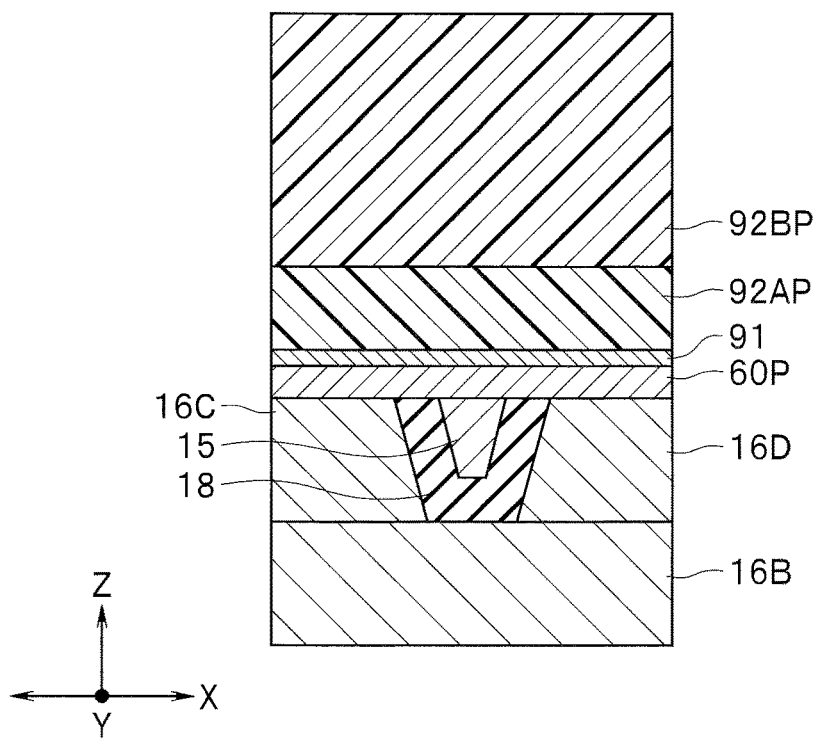
FIG. 11 is a cross-sectional view showing a step that follows the step shown in FIG. 10.

FIG. 11 shows the next step. In this step, first, a nonmagnetic metal layer 91 of Ru is formed on the layered film 60P. The nonmagnetic metal layer 91 has a thickness in the range of 5 to 10 nm, for example. Next, an initial lower layer 92AP and an initial upper layer 92BP are formed in this order over the nonmagnetic metal layer 91. The initial upper layer 92BP is a photoresist layer formed of a photoresist, and is to be patterned later by photolithography. The initial lower layer 92AP is formed of a material that dissolves in a developing solution to be used in patterning the initial upper layer 92BP.

Figure 12:
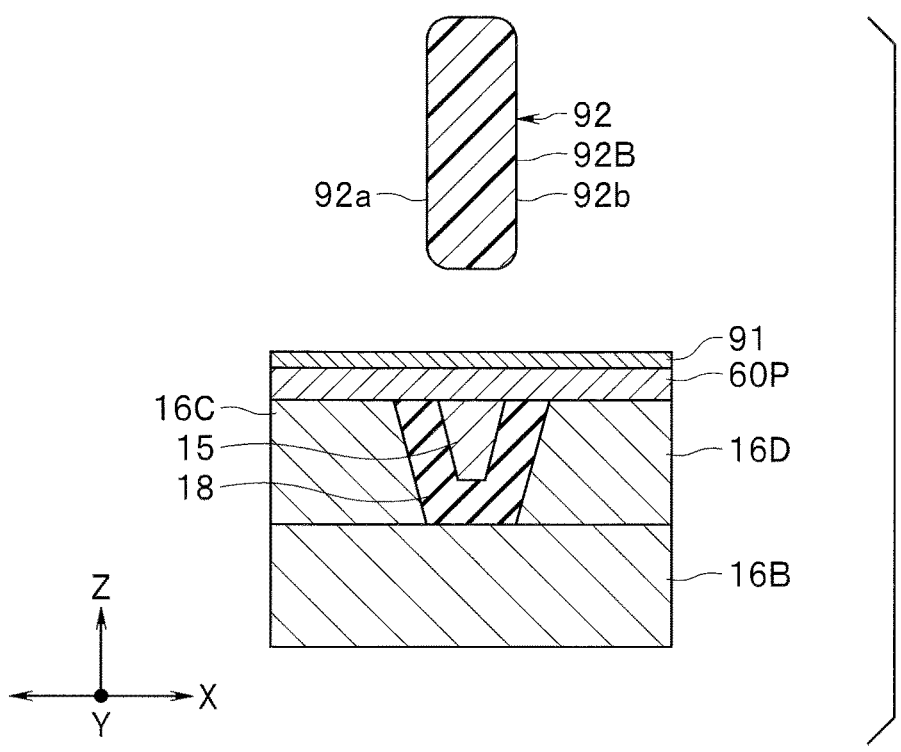
FIG. 12 is a cross-sectional view showing a step that follows the step shown in FIG. 11.

FIG. 12 shows the next step. In this step, the initial upper layer 92BP is patterned by photolithography and a portion of the initial lower layer 92AP is removed. This makes the initial lower layer 92AP into the lower layer and the initial upper layer 92BP into the upper layer 92B. The lower layer and the upper layer 92B constitute an etching mask 92. The etching mask 92 has an undercut. The etching mask 92 has a first sidewall 92a for defining the shape and the position of the first side surface 60e of the spin torque oscillator 60, and a second sidewall 92b for defining the shape and the position of the second side surface 60f of the spin torque oscillator 60.

When the initial upper layer 92BP is patterned, a portion of the initial lower layer 92AP that is interposed between the nonmagnetic metal layer 91 and the initial upper layer 92BP in the vicinity of the position ABS where the medium facing surface 80 is to be formed is removed. As a result, as shown in FIG. 12, a gap is formed between the nonmagnetic metal layer 91 and etching mask 92 in the vicinity of the position ABS where the medium facing surface 80 is to be formed. Note that even if the foregoing portion of the initial lower layer 92AP is removed, the etching mask 92 will not peel away since the lower layer remains between the nonmagnetic layer 91 and the upper layer 92B except in the vicinity of the position ABS where the medium facing surface 80 is to be formed.

Figure 13:
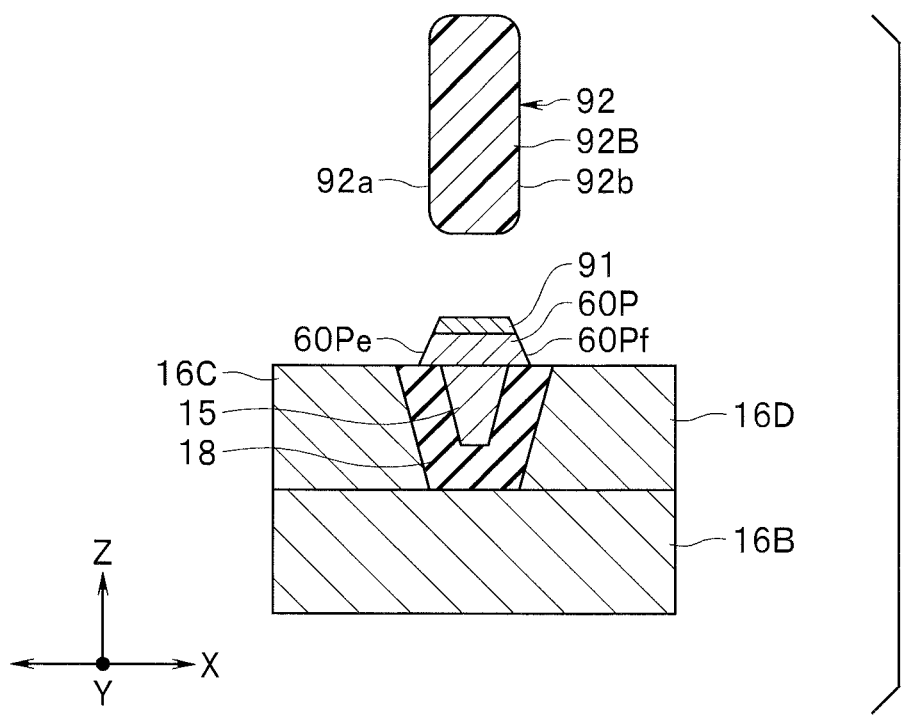
FIG. 13 is a cross-sectional view showing a step that follows the step shown in FIG. 12.

FIG. 13 shows the next step. In this step, the layered film 60P and the nonmagnetic metal layer 91 are etched using the etching mask 92 to form the first and second side surfaces 60e and 60f of the spin torque oscillator 60 in the layered film 60P. This etching continues until the first gap layer 18 and the side shields 16C and 16D are exposed. In FIG. 13 the symbol 60Pe represents a first initial side surface of the layered film 60P including the first side surface 60e, and the symbol 60Pf represents a second initial side surface of the layered film 60P including the second side surface 60f.

The etching of the layered film 60P and the nonmagnetic metal layer 91 is performed by IBE, for example. When employing IBE, it is preferred that after the layered film 60P and the nonmagnetic metal layer 91 are etched with the direction of travel of the ion beams perpendicular to the top surface 1a of the substrate 1, a stack consisting of the layered film 60P, the nonmagnetic metal layer 91 and the etching mask 92 be etched with the direction of travel of the ion beams inclined with respect to the first and second sidewalls 92a and 92b of the etching mask 92. If the layered film 60P and the nonmagnetic metal layer 91 are etched by IBE, flying substances generated during the etching of the layered film 60P and the nonmagnetic metal layer 91 can deposit onto the layered film 60P, the nonmagnetic metal layer 91 and the etching mask 92 to form a re-deposition film on the surfaces of the layered film 60P, the nonmagnetic metal layer 91 and the etching mask 92. In the case of employing IBE, it is possible to eliminate the re-deposition film by inclining the direction of travel of the ion beams as described above.

Figure 14:
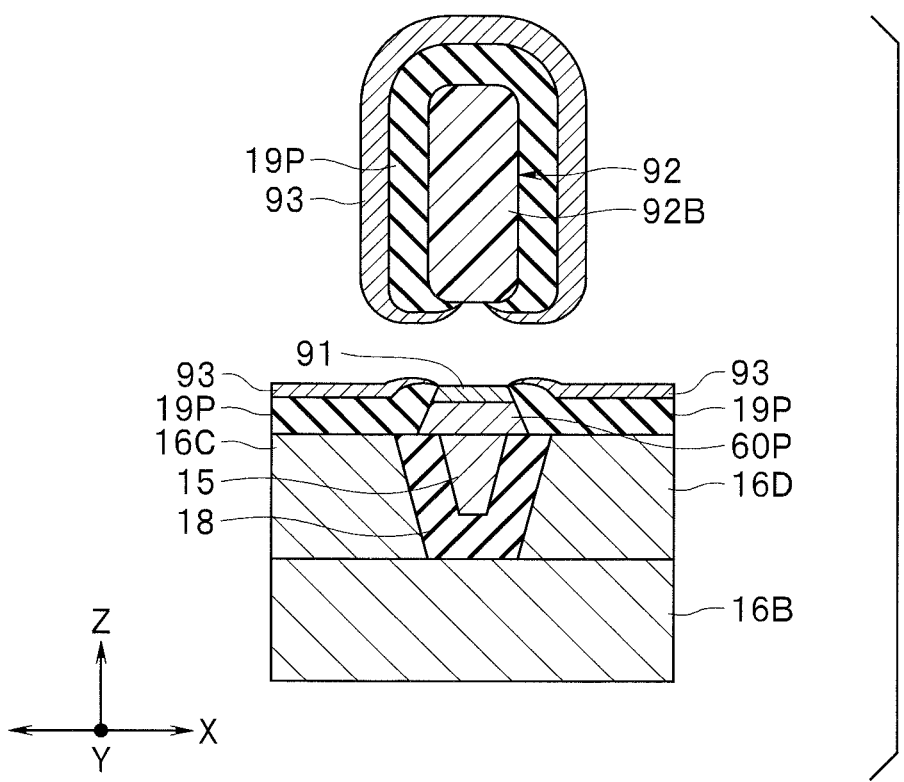
FIG. 14 is a cross-sectional view showing a step that follows the step shown in FIG. 13.

FIG. 14 shows the next step. In this step, first, with the etching mask 92 left intact, a nonmagnetic layer 19P for forming the second gap layer 19 is formed over the first gap layer 18 and the side shields 16C and 16D by IBD, for example. The nonmagnetic layer 19P is formed also on the surface of the etching mask 92. Next, a nonmagnetic metal layer 93 of Ru is formed over the top surface of the stack.

Figure 15:
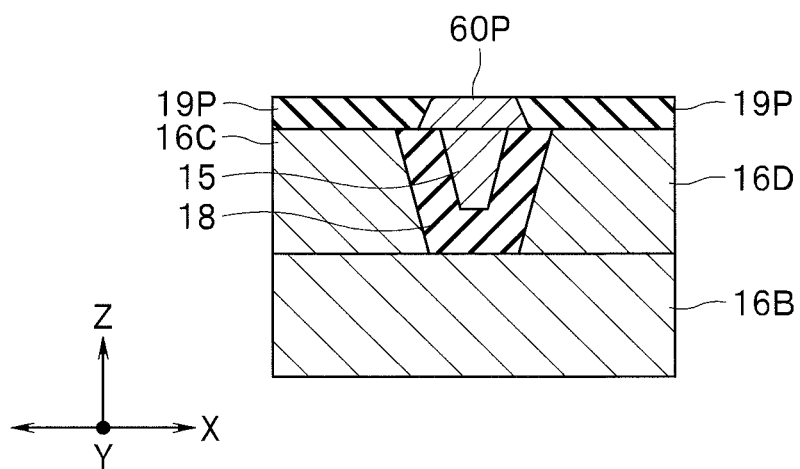
FIG. 15 is a cross-sectional view showing a step that follows the step shown in FIG. 14.

FIG. 15 shows the next step. In this step, first, the etching mask 92 is lifted off. The nonmagnetic metal layers 91 and 93 and the nonmagnetic layer 19P are then etched by, for example, IBE until the layered film 60P is exposed.

Figure 16:
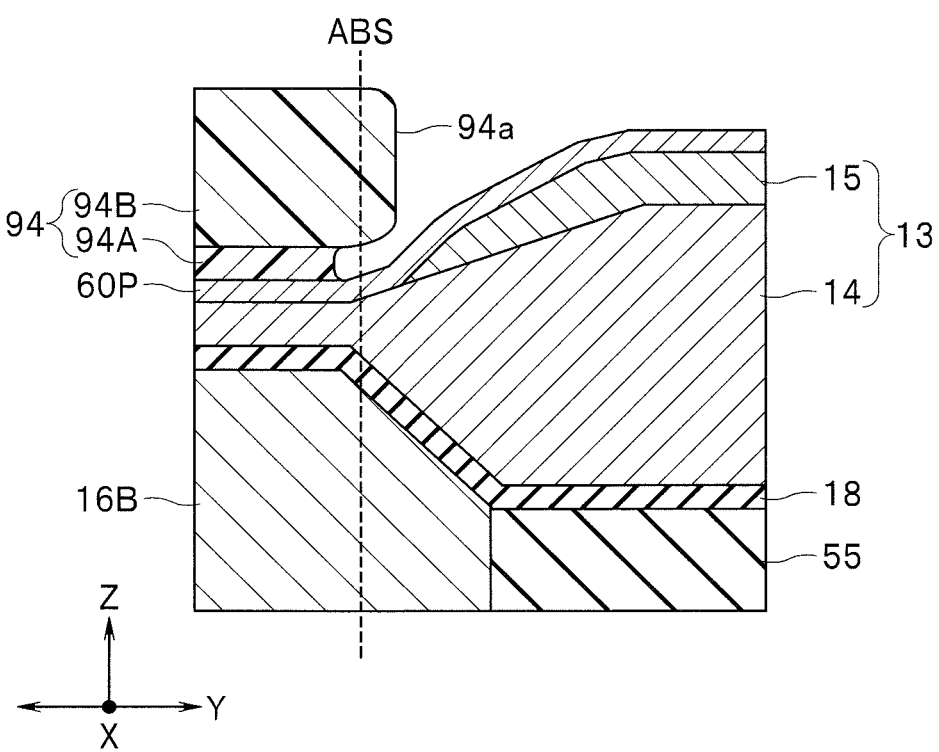
FIG. 16 is a cross-sectional view showing a step that follows the step shown in FIG. 15.

FIG. 16 shows the next step. In this step, an etching mask 94 is formed on the layered film 60P. The etching mask 94 has an undercut. The etching mask 94 includes, for example, a lower layer 94A lying on the layered film 60P and an upper layer 94B lying on the lower layer 94A. The lower layer 94A and the upper layer 94B are formed by the same method as that employed to form the lower layer and the upper layer 92B of the etching mask 92. The etching mask 94 has a sidewall 94a for defining the shape and the position of the rear end face 60b of the spin torque oscillator 60.

Figure 17:
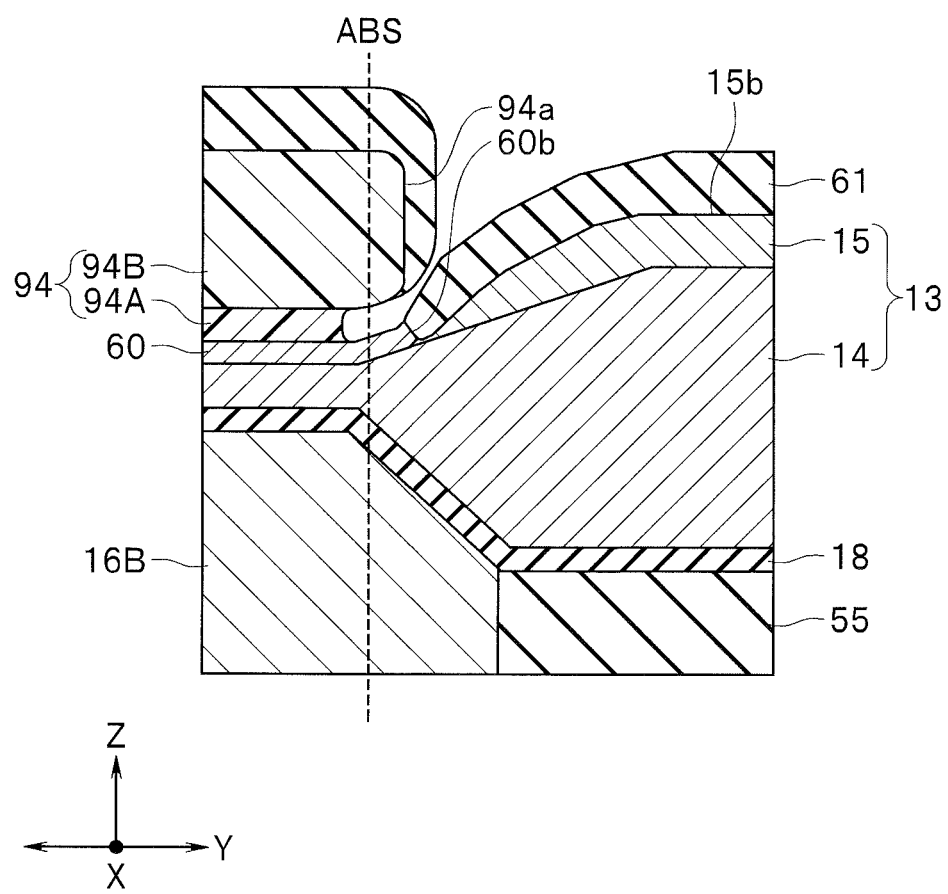
FIG. 17 is a cross-sectional view showing a step that follows the step shown in FIG. 16.

FIG. 17 shows the next step. In this step, a patterning step is performed first. The patterning step is a step of patterning the layered film 60P by etching to cause the layered film 60P to become the spin torque oscillator 60. In the patterning step, the layered film 60P is etched by, for example, IBE using the etching mask 94 to form the rear end face 60b of the spin torque oscillator 60 in the layered film 60P. This etching continues until the second layer 15 of the main pole 13 is exposed. A portion of the first initial side surface 60Pe of the layered film 60P remaining after the etching becomes the first side surface 60e of the spin torque oscillator 60. A portion of the second initial side surface 60Pf of the layered film 60P remaining after the etching becomes the second side surface 60f of the spin torque oscillator 60. The layered film 60P thereby becomes the spin torque oscillator 60.

In the patterning step, the second layer 15 also undergoes etching together with the layered film 60P when the layered film 60P is patterned. In the example shown in FIG. 17, the top surface 15b of the second layer 15 has been slightly etched.

In the step shown in FIG. 17, the insulating layer 61 is then formed over the entire top surface of the stack by, for example, IBD with the etching mask 94 left intact.

Figure 18:
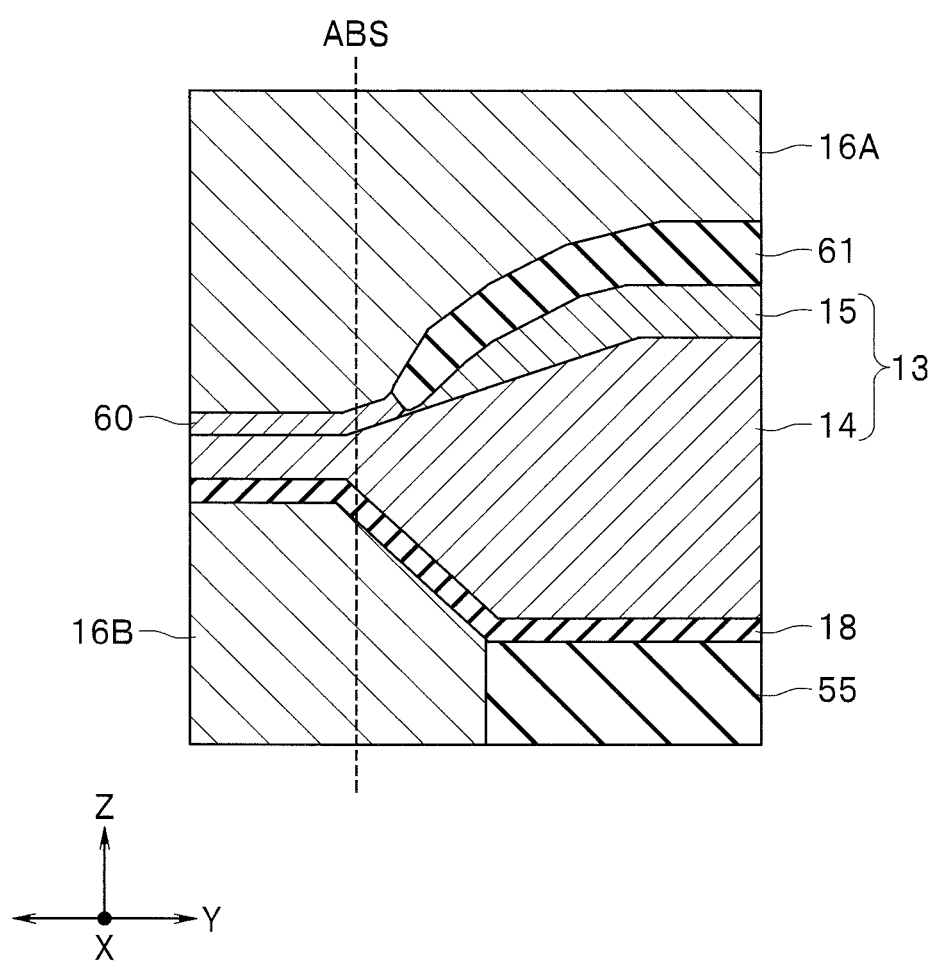
FIG. 18 is a cross-sectional view showing a step that follows the step shown in FIG. 17.

FIG. 18 shows the next step. In this step, first, the etching mask 94 is lifted off. Next, the nonmagnetic layer 19P is selectively etched to cause the top surfaces of the side shields 16C and 16D to be exposed in part. This forms the first and second portions 19A and 19B of the second gap layer 19. The insulating layer 61 is also selectively etched to cause the top surface 15b of the second layer 15 of the main pole 13 to be exposed. Next, the trailing shield 16A is formed over the side shields 16C and 16D, the second gap layer 19, the spin torque oscillator 60 and the insulating layer 61, and the coupling section 41 is formed on the second layer 15 by performing frame plating, for example.

Steps following the formation of the trailing shield 16A and the coupling section 41 will be described below with reference to FIG. 5 and FIG. 6. First, the insulating film 62 is formed over the entire top surface of the stack. The insulating layer 61 and the insulating film 62 are then selectively etched to form therein an opening for exposing the top surface of the second connection layer. Next, the upper coil portion 20 is formed by frame plating, for example. The second nonmagnetic layer (not shown) is then formed over the entire top surface of the stack. The insulating film 62 and the second nonmagnetic layer are then formed by, for example, CMP, until the trailing shield 16A, the upper coil portion 20 and the coupling section 41 are exposed.

Next, the insulating layer 63 is formed over the entire top surface of the stack. Then, the insulating layer 63 is selectively etched to form therein an opening for exposing the top surface of the trailing shield 16A, and the top surface of a portion of the insulating layer 63 covering the top surface of the coupling section 41 is also etched. The coupling section 42 is then formed by frame plating, for example. Next, the protective layer 70 is formed over the entire top surface of the stack. For example, the step of forming the wirings 83 and 84 is performed simultaneously with a series of steps from the step of forming the initial first layer to the step of forming the protective layer 70.

Wiring and a plurality of terminals including the terminals 81 and 82 are then formed on the protective layer 70, and the substrate 1 is cut near the position ABS where the medium facing surface 80 is to be formed. The cut surface is then polished into the medium facing surface 80, and further processes such as fabrication of flying rails are performed to complete the magnetic head.

As has been described, the manufacturing method of the magnetic head according to the present embodiment includes the steps of: forming the coil including the upper coil portion 20 and the lower coil portion 10; forming the main pole 13; forming the spin torque oscillator 60; and forming the trailing shield 16A after the spin torque oscillator 60 is formed. The step of forming the main pole 13 includes the steps of: forming the first layer 14; and forming the second layer 15 such that at least part of the second layer 15 is located on the thickness-changing portion 14C of the first layer 14. The step of forming the first layer 14 includes a step of forming the initial first layer that is to later become the first layer 14, and an etching step of taper-etching the initial first layer to form an inclined surface corresponding to the inclined portion 14T1 in the initial first layer. In the present embodiment, the etching step is the step of forming the inclined portion 14T1 in the initial first layer. The step of forming the second layer 15 is performed after the etching step.

The step of forming the spin torque oscillator 60 includes: a step of forming the layered film 60P, which is to later become the spin torque oscillator 60; and a patterning step of patterning the layered film 60P by etching to cause the layered film 60P to become the spin torque oscillator 60. In the present embodiment, the step of forming the spin torque oscillator 60 is performed after the step of forming the second layer 15. Further, in the present embodiment, the step of forming the layered film 60P is the step of forming the layered film 60P on the inclined portion 14T1 and the top surface of the second layer 15.

Modification Example

Figure 19:
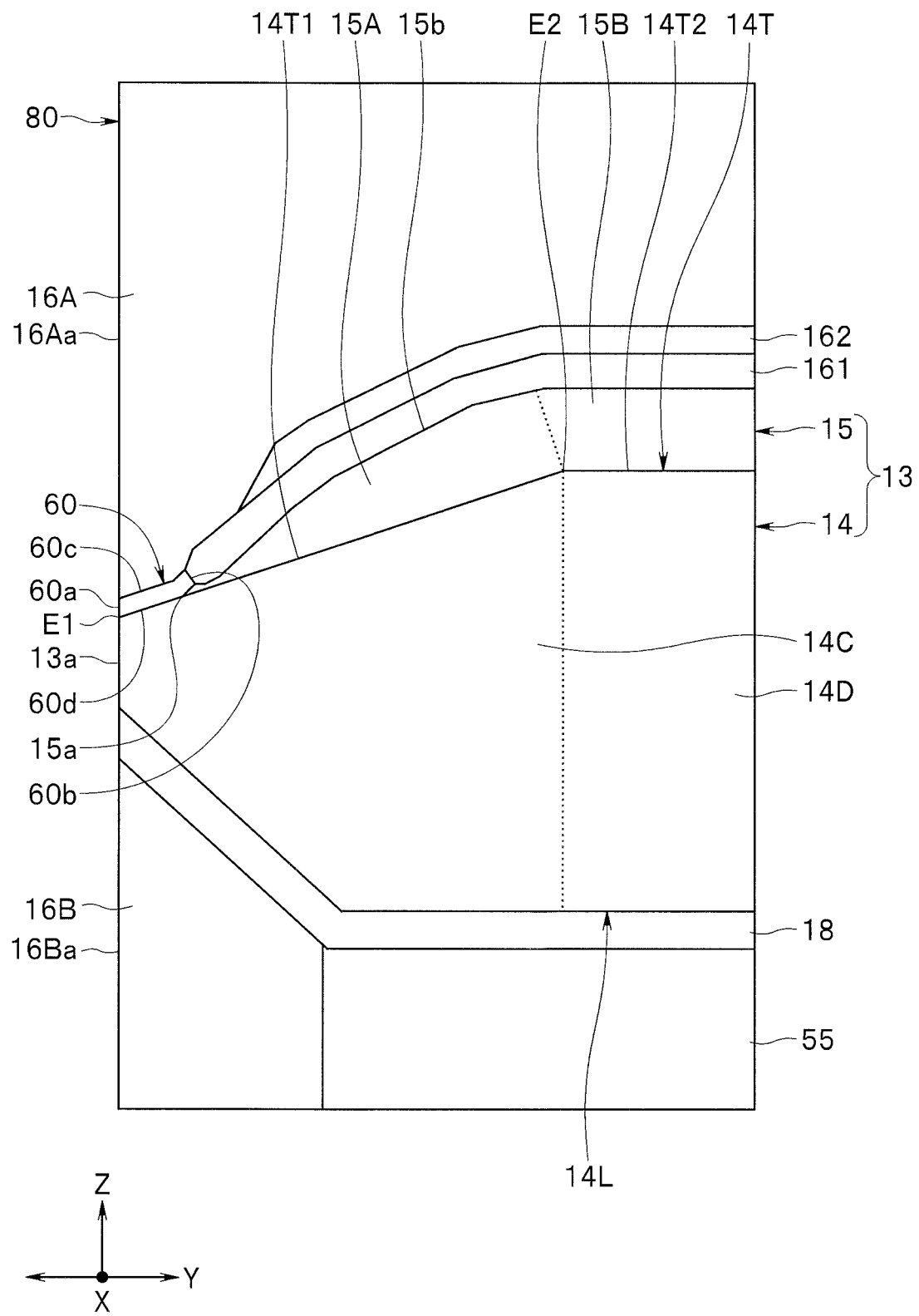
FIG. 19 is a cross-sectional view showing essential parts of a modification example of the magnetic head according to the first embodiment of the invention.

A modification example of the magnetic head according to the present embodiment will now be described with reference to FIG. 19. FIG. 19 is a cross-sectional view showing essential parts of the modification example of the magnetic head according to the present embodiment. In the modification example, the magnetic head includes a first insulating layer 161 and a second insulating layer 162 formed of an insulating material, instead of the insulating layer 61 shown in FIG. 3. The first and second insulating layers 161 and 162 are formed of the same material as that used for the insulating layer 61, for example.

The first insulating layer 161 covers a portion of the top surface 15b of the second layer 15. The second insulating layer 162 lies on the first insulating layer 161. The first insulating layer 161 has a first end closest to the medium facing surface 80. The first end is in contact with the rear end face 60b of the spin torque oscillator 60. The second insulating layer 162 has a second end closest to the medium facing surface 80. The second end is located farther from the medium facing surface 80 than the first end. Each of the first and second insulating layers 161 and 162 has a maximum thickness (maximum dimension in the Z direction) in the range of 50 to 100 nm, for example.

In the modification example, the trailing shield 16A is disposed over the side shields 16C and 16D, the second gap layer 19, the spin torque oscillator 60, the first insulating layer 161 and the second insulating layer 162, and in contact with the top surfaces of the side shields 16C and 16D, the second gap layer 19, the spin torque oscillator 60, the first insulating layer 161 and the second insulating layer 162.

Second Embodiment

Figure 20:
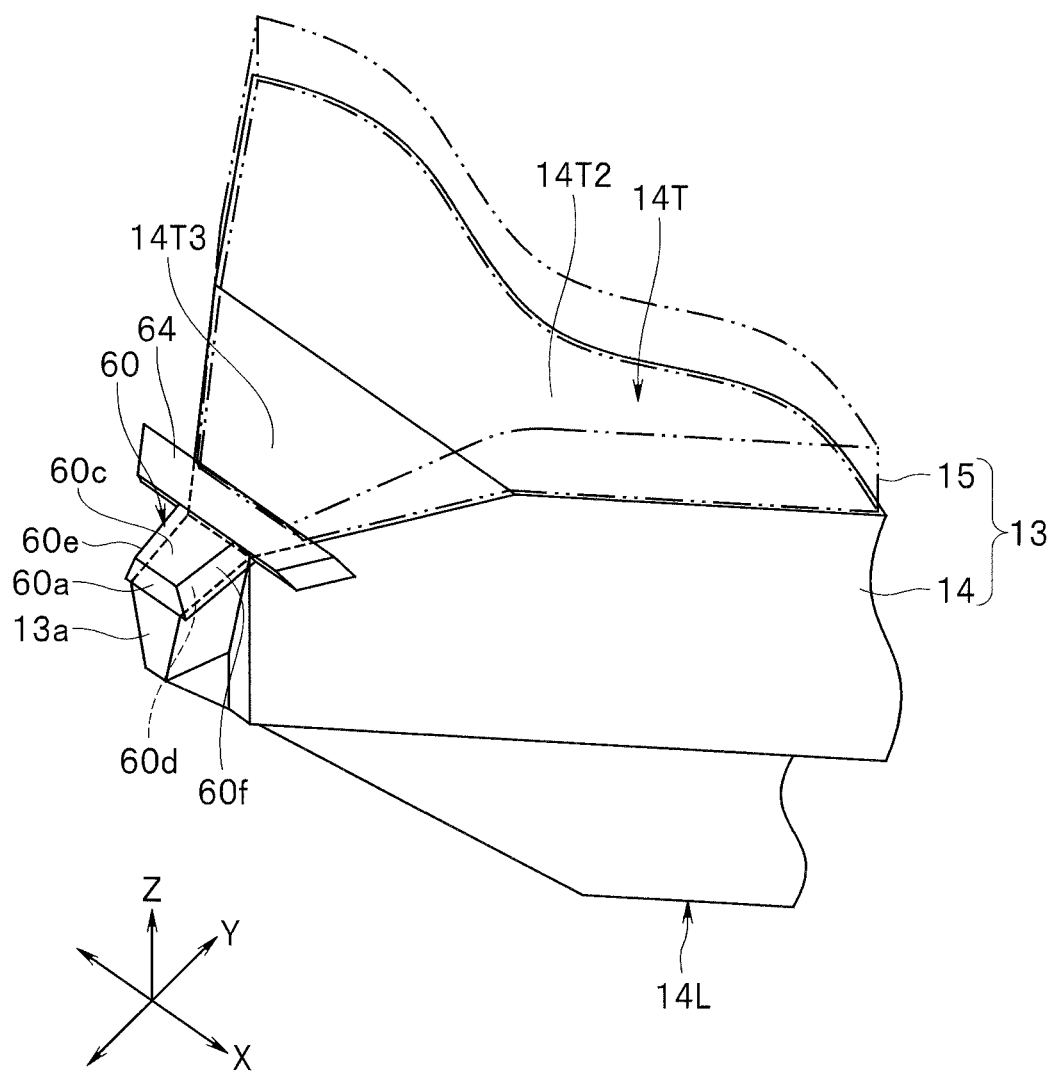
FIG. 20 is a perspective view showing essential parts of a magnetic head according to a second embodiment of the invention.
Figure 21:
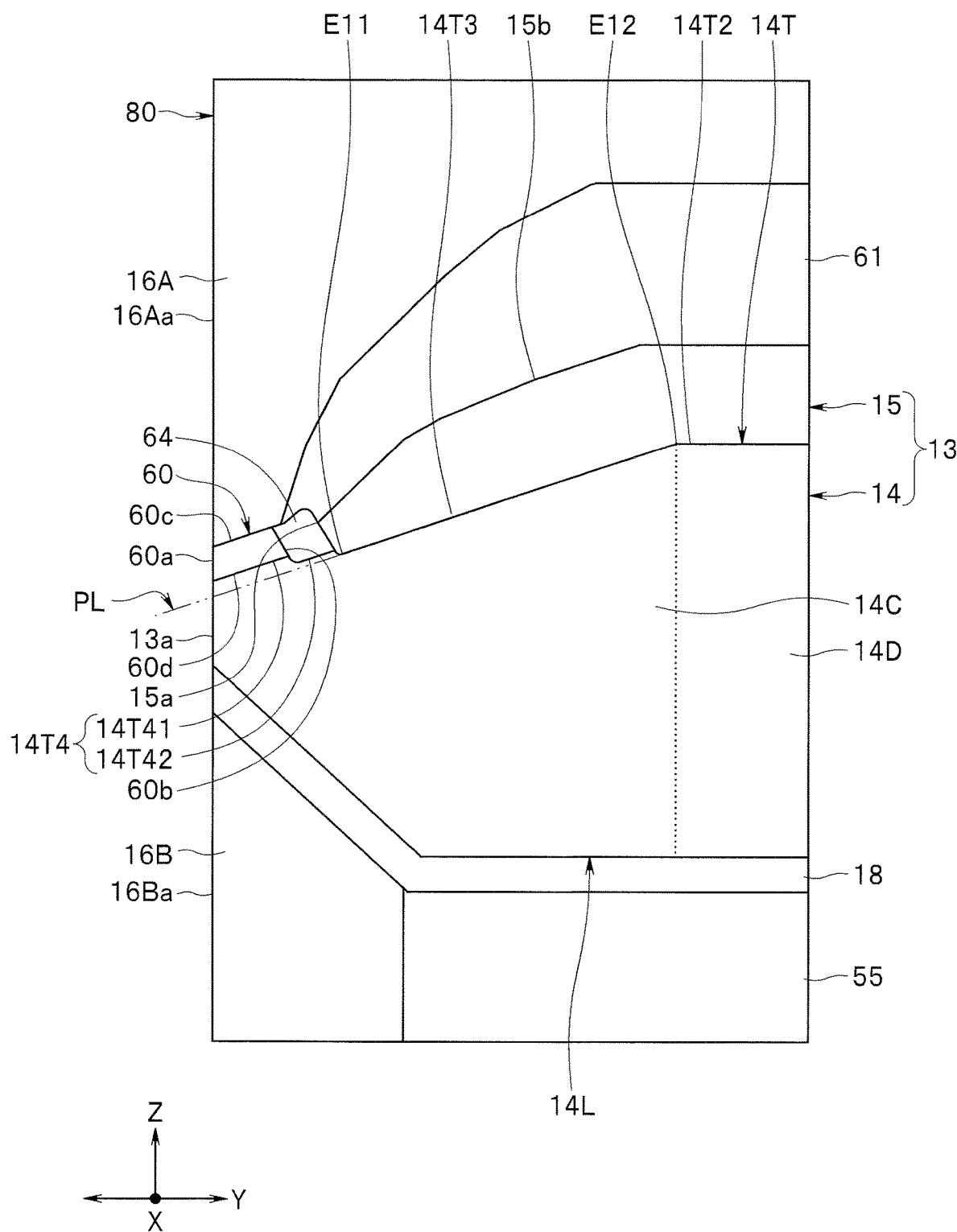
FIG. 21 is a cross-sectional view showing essential parts of the magnetic head according to the second embodiment of the invention.

A magnetic head according to a second embodiment of the invention will now be described with reference to FIG. 20 and FIG. 21. FIG. 20 is a perspective view showing essential parts of the magnetic head according to the present embodiment. FIG. 21 is a cross-sectional view showing essential parts of the magnetic head according to the present embodiment.

The magnetic head according to the present embodiment differs from the first embodiment in the following ways. In the present embodiment, the top surface 14T of the first layer 14 of the main pole 13 includes an inclined portion 14T3 instead of the inclined portion 14T1 of the first embodiment. The inclined portion 14T3 is included in the thickness-changing portion 14C. The inclined portion 14T3 has a rear end E12 located farthest from the medium facing surface 80, and a front end E11 located opposite to the rear end E12 in the inclined portion 14T3. In the present embodiment, the front end E11 is specifically located at a distance from the medium facing surface 80. An entirety of the inclined portion 14T3 is inclined with respect to the medium facing surface 80 and a direction perpendicular to the medium facing surface 80 such that the rear end E12 is located farther from the top surface 1a of the substrate 1 than the front end E11. The flat portion 14T2 of the top surface 14T is connected to the rear end E12.

In the present embodiment, the top surface 14T of the first layer 14 further includes a stepped portion 14T4 located closer to the medium facing surface 80 than the inclined portion 14T3. Assume here an imaginary plane PL including the inclined portion 14T3, as shown in FIG. 21. The stepped portion 14T4 protrudes from the imaginary plane PL in a direction away from the top surface 1a (see FIGS. 5 and 6) of the substrate 1. The stepped portion 14T4 includes a first portion 14T41 and a second portion 14T42. The first portion 14T41 has an end located on the medium facing surface 80. The second portion 14T42 is located farther from the medium facing surface 80 than the first portion 14T41 and closer to the imaginary plane PL than the first portion 14T41.

The spin torque oscillator 60 is disposed on the first portion 14T41 of the stepped portion 14T4. The magnetic head according to the present embodiment further includes an insulating layer 64 formed of an insulating material and interposed between the spin torque oscillator 60 and the end 15a of the second layer 15 of the main pole 13. The insulating layer 64 is disposed on the second portion 14T42 of the stepped portion 14T4. The dimension of the insulating layer 64 in a direction perpendicular to the medium facing surface 80 (the Y direction) is in the range of 20 to 80 nm, for example. The insulating layer 64 is formed of alumina or silicon oxide, for example.

In the present embodiment, the distance from the end 15a of the second layer 15 to the medium facing surface 80 is greater than in the first embodiment by the dimension of the insulating layer 64. The distance from the end 15a of the second layer 15 to the medium facing surface 80 is in the range of 40 to 100 nm, for example.

In the present embodiment, the insulating layer 61 covers a portion of the top surface of the second layer 15 and a portion of the top surface of the insulating layer 64. An end of the insulating layer 61 that is closest to the medium facing surface 80 is in contact with the top surface of the insulating layer 64. The trailing shield 16A lies over the side shields 16C and 16D, the second gap layer 19, the spin torque oscillator 60 and the insulating layers 61 and 64, and is in contact with the top surfaces of the side shields 16C and 16D, the second gap layer 19, the spin torque oscillator 60 and the insulating layers 61 and 64.

A manufacturing method of the magnetic head according to the second embodiment of the invention will now be described with reference to FIG. 22 to FIG. 28. FIG. 22 to FIG. 28 each illustrate a stack of layers formed in the process of manufacturing the magnetic head according to the present embodiment. FIGS. 22 to 26 and FIG. 28 omit the illustration of portions that are closer to the substrate 1 (see FIGS. 5 and 6) relative to the leading shield 16B and the nonmagnetic layer 55. FIGS. 22 to 26 and FIG. 28 each illustrate a cross section perpendicular to the medium facing surface 80 and to the top surface 1a of the substrate 1. In FIGS. 22 to 26 and FIG. 28, the symbol ABS represents the position where the medium facing surface 80 is to be formed. FIG. 27 is a perspective view showing the step of FIG. 26.

Figure 22:
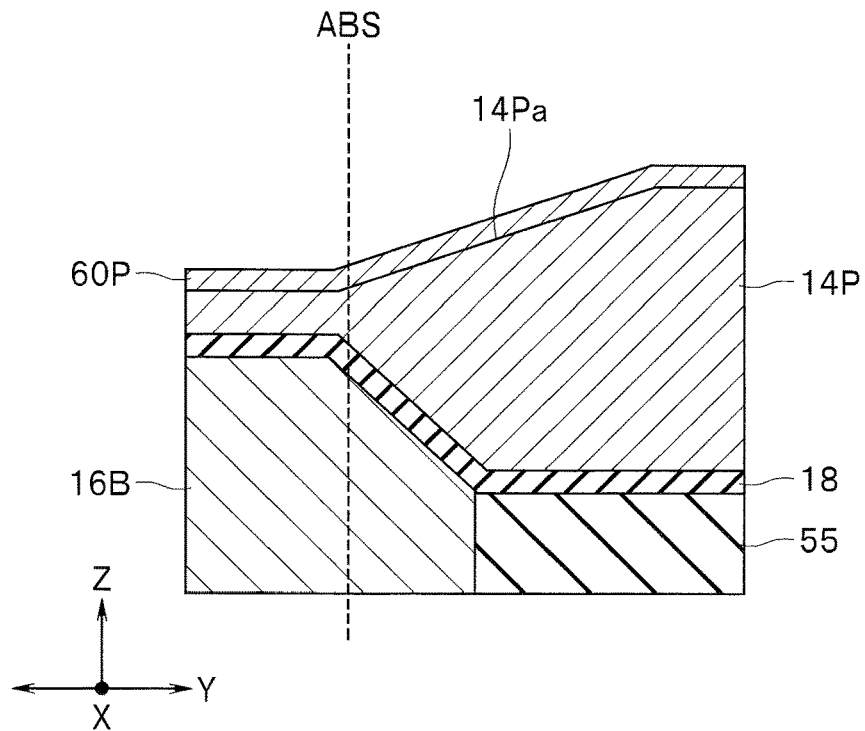
FIG. 22 is a cross-sectional view showing a step of a manufacturing method of the magnetic head according to the second embodiment of the invention.

The manufacturing method of the magnetic head according to the present embodiment is the same as the method according to the first embodiment up to the step of forming the initial first layer. FIG. 22 shows a step following the formation of the initial first layer. In FIG. 22, the symbol 14P represents the initial first layer. In this step, an etching step is performed first. In the etching step, the initial first layer 14P is taper-etched by, for example, IBE to form an inclined surface 14Pa corresponding to the inclined portion 14T3 (see FIGS. 20 and 21) of the top surface 14T of the first layer 14 in the initial first layer 14P. In the etching step, the side shields 16C and 16D (see FIG. 6), the first gap layer 18 (see FIGS. 5 and 6) and the first nonmagnetic layer (not shown) are also etched in part. Next, a layered film 60P, which is to become the spin torque oscillator 60 later, is formed on the stack including the initial first layer 14P. In the present embodiment, the layered film 60P is formed on the inclined surface 14Pa formed by the etching step in the initial first layer 14P.

Figure 23:
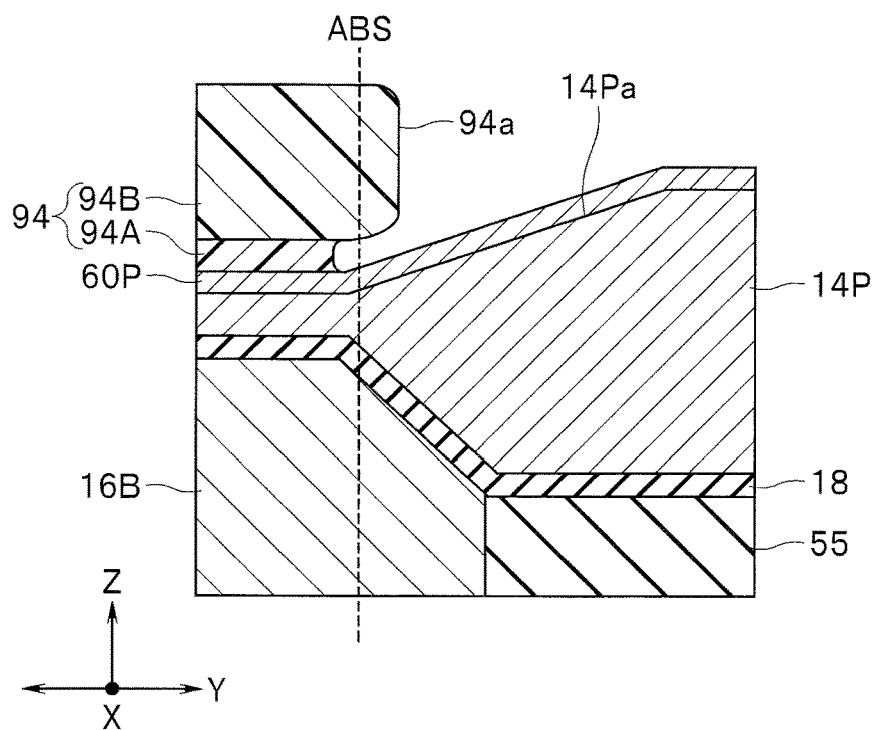
FIG. 23 is a cross-sectional view showing a step that follows the step shown in FIG. 22.

FIG. 23 shows the next step. In this step, steps similar to a series of steps in the first embodiment described with reference to FIGS. 11 to 16 are performed to etch the layered film 60P to thereby form the first and second side surfaces 60e and 60f (the first and second initial side surfaces 60Pe and 60Pf) in the layered film 60P, and also form the nonmagnetic layer 19P (see FIGS. 14 and 15) for forming the second gap layer 19, and the etching mask 94. FIG. 23 shows the stack after the formation of the etching mask 94.

Figure 24:
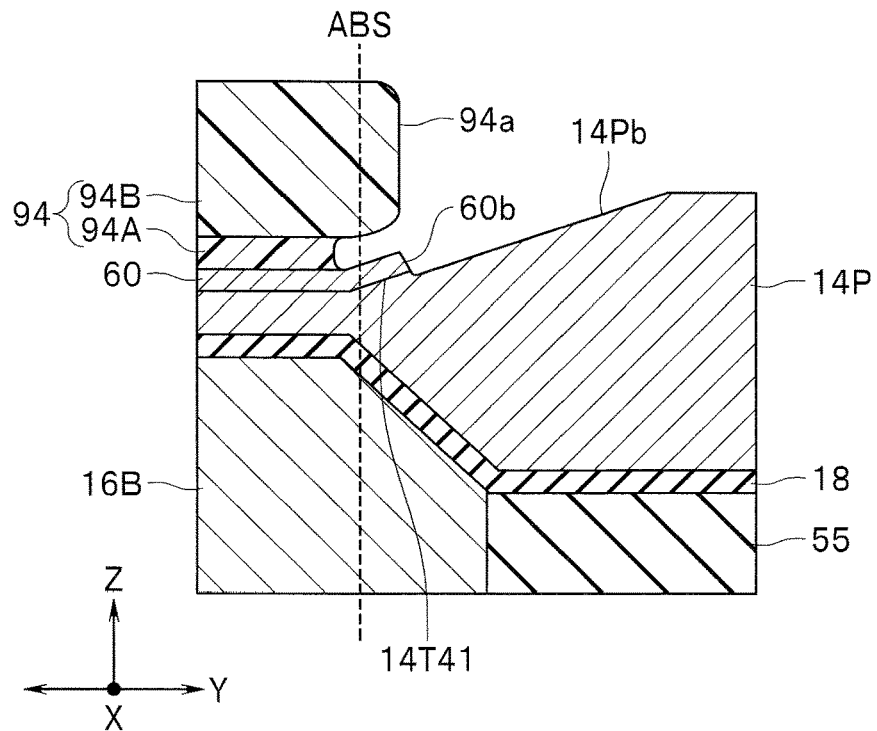
FIG. 24 is a cross-sectional view showing a step that follows the step shown in FIG. 23.

FIG. 24 shows the next step. In this step, a patterning step of patterning the layered film 60P by etching is performed. In the patterning step, the layered film 60P is etched by, for example, IBE using the etching mask 94 to form the rear end face 60b of the spin torque oscillator 60 in the layered film 60P. This causes the layered film 60P to become the spin torque oscillator 60.

In the patterning step, the initial first layer 14P is etched in succession to the layered film 60P. As a result, a portion of the inclined surface 14Pa not covered with the spin torque oscillator 60 is etched to form an inclined surface 14Pb. The etching depth of the inclined surface 14Pa falls within the range of 5 to 10 nm, for example. An unetched portion of the inclined surface 14Pa becomes the first portion 14T41 of the stepped portion 14T4 of the top surface 14T of the first layer 14. In other words, this etching forms the first portion 14T41 of the stepped portion 14T4 in the initial first layer 14P.

Figure 25:
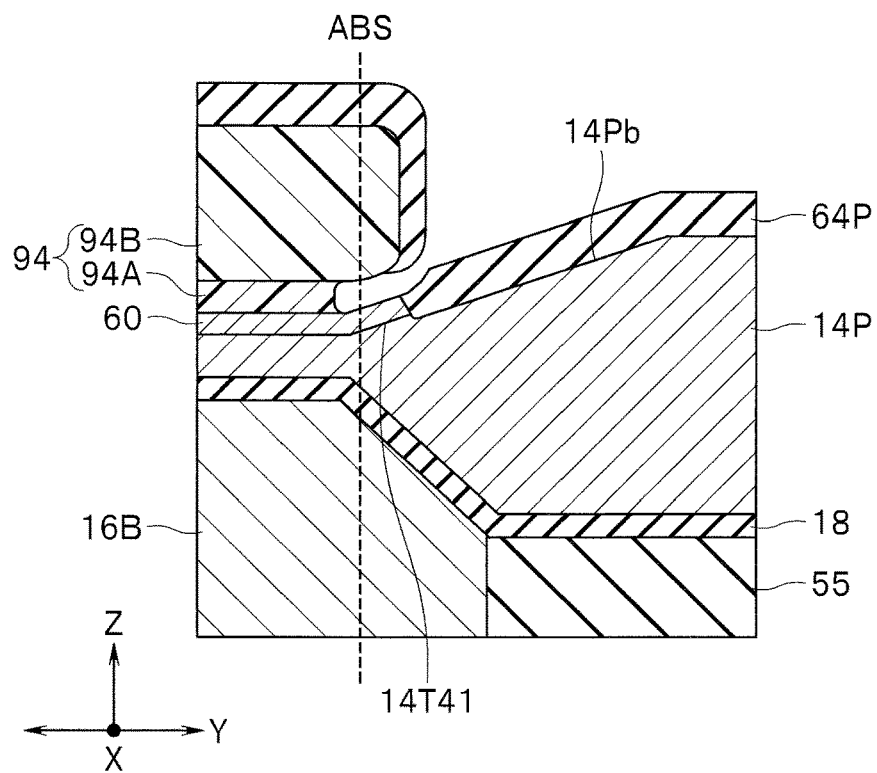
FIG. 25 is a cross-sectional view showing a step that follows the step shown in FIG. 24.

FIG. 25 shows the next step. In this step, first, an initial insulating layer 64P of an insulating material is formed over the entire top surface of the stack by, for example, IBD, with the etching mask 94 left intact. The initial insulating layer 64P has a maximum thickness (maximum dimension in the Z direction) in the range of 30 to 50 nm, for example. The initial insulating layer 64P is formed also on the surfaces of the etching mask 92. The etching mask 94 is then lifted off.

Figure 26:
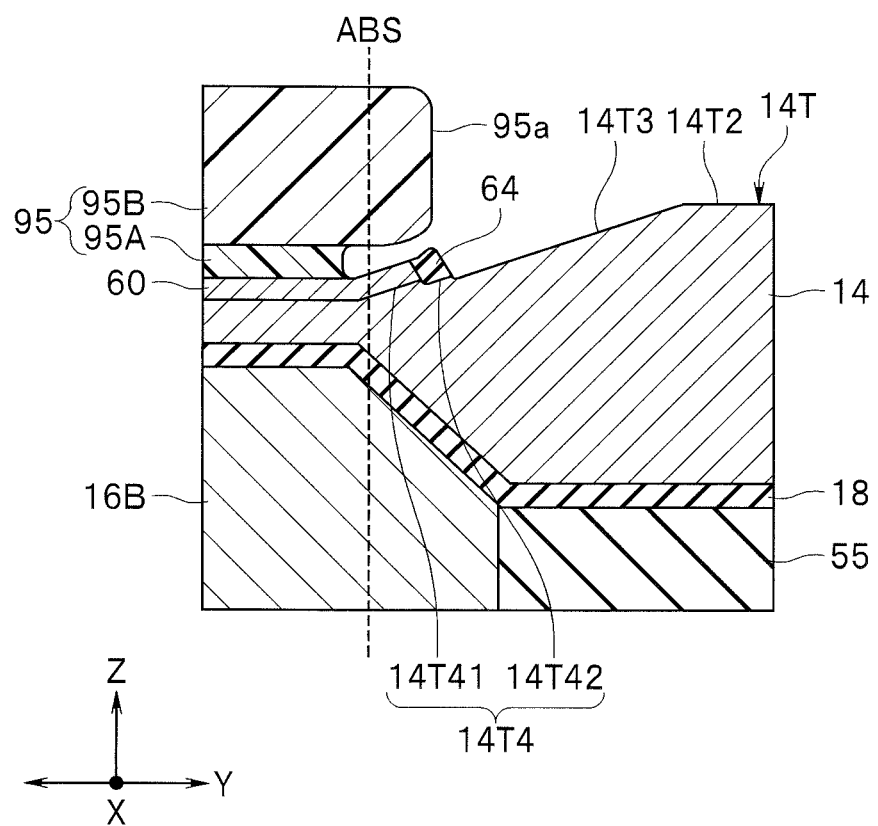
FIG. 26 is a cross-sectional view showing a step that follows the step shown in FIG. 25.
Figure 27:
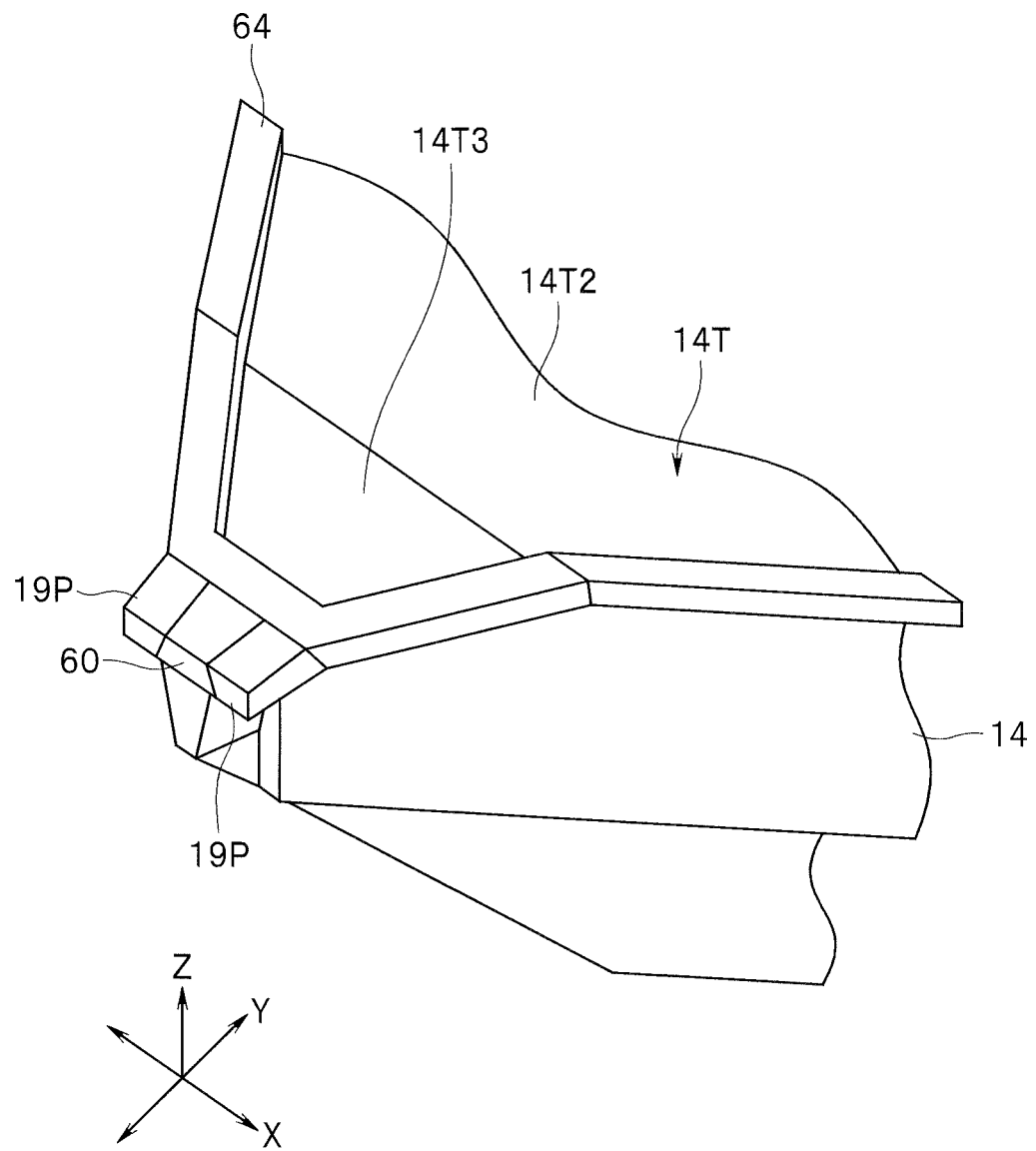
FIG. 27 is a perspective view showing the step of FIG. 26.

FIG. 26 shows the next step. In this step, first, an etching mask 95 is formed on the stack including the spin torque oscillator 60. The etching mask 95 has an undercut. The etching mask 95 includes, for example, a lower layer 95A lying on the stack and an upper layer 95B lying on the lower layer 95A. The lower layer 95A and the upper layer 95B are formed by the same method as that employed to form the lower layer 94A and the upper layer 94B of the etching mask 94. The etching mask 95 has a sidewall 95a for defining the shape and the position of the end 15a (see FIG. 21) of the second layer 15.

Next, the initial insulating layer 64P is etched by, for example, IBE using the etching mask 95 to cause the initial insulating layer 64P to become the insulating layer 64. In this etching, the initial first layer 14P is etched in succession to the initial insulating layer 64P. As a result, a portion of the inclined surface 14Pb not covered with the spin torque oscillator 60 and the insulating layer 64 is etched to form the inclined portion 14T3. The etching depth of the inclined surface 14Pb falls within the range of 5 to 10 nm, for example. An unetched portion of the inclined surface 14Pb becomes the second portion 14T42 of the stepped portion 14T4 of the top surface 14T of the first layer 14. In other words, this etching forms the inclined portion 14T3 and the second portion 14T42 of the stepped portion 14T4 in the initial first layer 14P. The initial first layer 14P becomes the first layer 14 upon formation of the inclined portion 14T3 and the second portion 14T42 of the stepped portion 14T4. A portion of the top surface of the initial first layer 14P remaining after the etching becomes the flat portion 14T2.

The etching mask 95 may have an opening shaped to correspond to the plane shape (the shape as viewed from above) of the second layer 15. In such a case, the sidewall 95a of the etching mask 95 is a portion of the wall face of the opening. In such a case, etching the initial insulating layer 64P in the above-described manner results in the formation an accommodation portion for accommodating a portion of the second layer 15 in the insulating layer 64. FIG. 27 shows an example of such a case.

Figure 28:
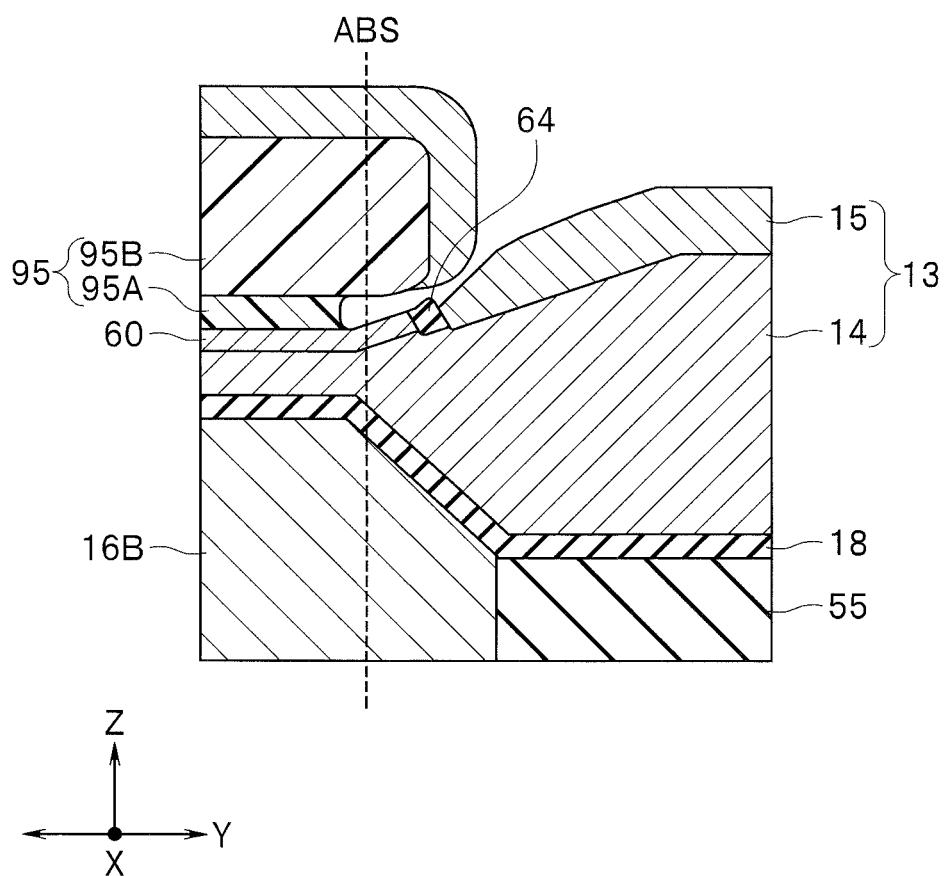
FIG. 28 is a cross-sectional view showing a step that follows the step shown in FIG. 26.

FIG. 28 shows the next step. In this step, first, with the etching mask 95 left intact, the second layer 15 is formed by IBD or sputtering, for example. Next, the etching mask 95 is lifted off. Then, a mask (not shown) is formed on the stack. With the mask left intact, the insulating layer 61 is then formed over the entire top surface of the stack by IBD, for example. The mask is then lifted off. Next, the nonmagnetic layer 19P is selectively etched to cause the top surfaces of the side shields 16C and 16D to be exposed in part. This forms the first and second portions 19A and 19B of the second gap layer 19. The subsequent steps are the same as those in the first embodiment.

As has been described, the step of forming the first layer 14 in the present embodiment includes the etching step of taper-etching the initial first layer 14P to form the inclined surface 14Pa corresponding to the inclined portion 14T3 in the initial first layer 14P, instead of the etching step of the first embodiment. The step of forming the spin torque oscillator 60 is performed after the etching step and before the step of forming the second layer 15.

In the present embodiment, the step of forming the layered film 60P is the step of forming the layered film 60P on the inclined surface 14Pa formed by the etching step in the initial first layer 14P. The patterning step is the step of patterning the layered film 60P and etching the initial first layer 14P in succession to the etching of the layered film 60P to thereby form the first portion 14T41 of the stepped portion 14T4 in the initial first layer 14P.

The manufacturing method of the magnetic head according to the present embodiment further includes the step of forming the insulating layer 64 after the step of forming the spin torque oscillator 60, i.e., the patterning step and before the step of forming the second layer 15. The step of forming the insulating layer 64 includes the step of forming the initial insulating layer 64P of an insulating material and the step of etching the initial insulating layer 64P to cause the initial insulating layer 64P to become the insulating layer 64. In the present embodiment, the step of etching the initial insulating layer 64P is the step of etching the initial insulating layer 64P and etching the initial first layer 14P in succession to the etching of the initial insulating layer 64P to thereby form the inclined portion 14T3 and the second portion 14T42 of the stepped portion 14T4 in the initial first layer 14P.

In the present embodiment, the initial first layer 14P is etched in each of the patterning step and the step of etching the initial insulating layer 64P. This causes the first layer 14 to be smaller in thickness (dimension in the Z direction) than the initial first layer 14P after the formation of the inclined surface 14Pa. As a result, the first layer 14 has a small cross-sectional area in the vicinity of the medium facing surface 80. To cope with this, in the present embodiment, the second layer 15 is formed on the inclined portion 14T3 formed in the step of etching the initial insulating layer 64P. The present embodiment thus uses the second layer 15 to supplement the thickness of the main pole 13 reduced by the etching of the initial first layer 14P. The present embodiment thereby makes it possible to prevent the write characteristics of the magnetic head from being degraded.

Modification Example

Figure 29:
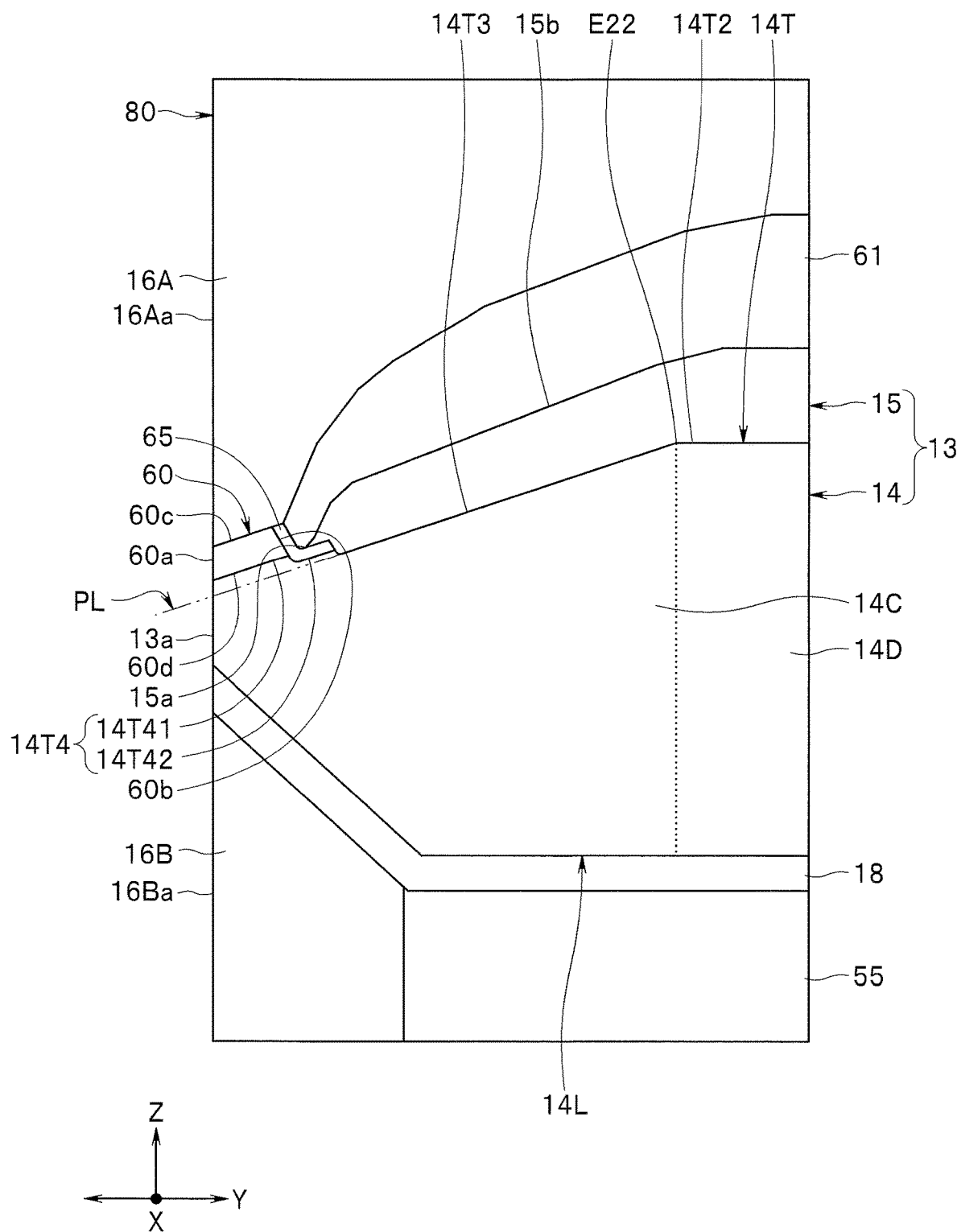
FIG. 29 is a cross-sectional view showing essential parts of a first modification example of the magnetic head according to the second embodiment of the invention.

Next, a first and a second modification example of the magnetic head according to the present embodiment will be described. The first modification example will be described first with reference to FIG. 29. FIG. 29 is a cross-sectional view showing essential parts of the first modification example of the magnetic head according to the present embodiment. In the first modification example, the magnetic head includes an insulating layer 65 of an insulating material, in place of the insulating layer 64. The insulating layer 65 is formed of the same material as the insulating layer 64, for example. The insulating layer 65 is disposed along the rear end face 60b of the spin torque oscillator 60 and the first portion 14T41 of the stepped portion 14T4 of the top surface 14T of the first layer 14 of the main pole 13. The dimension of the insulating layer 65 in a direction perpendicular to the rear end face 60b or a direction perpendicular to the first portion 14T41 of the stepped portion 14T4, i.e., the thickness of the insulating layer 65, falls within the range of 10 to 30 nm, for example. The second layer 15 of the main pole 13 rides over the insulating layer 65.

Now, a method of forming the insulating layer 65 will be described briefly. The method of forming the insulating layer 65 is basically the same as the method of forming the insulating layer 64. Specifically, the step of forming the insulating layer 65 includes the step of forming an initial insulating layer and the step of etching the initial insulating layer to cause the initial insulating layer to become the insulating layer 65.

The step of forming the insulating layer 65 is performed after the patterning step that has been described with reference to FIG. 24. In the step of forming the insulating layer 65, first, an initial insulating layer of an insulating material is formed over the entire top surface of the stack by, for example, IBD, with the etching mask 94 (see FIG. 24) which has been used in the patterning step left intact. The initial insulating layer has a maximum thickness (maximum dimension in the Z direction) smaller than that of the initial insulating layer 64P shown in FIG. 25. Next, the etching mask 94 is lifted off. Next, the etching mask 95 shown in FIG. 26 is formed. The initial insulating layer is then etched using the etching mask 95 by, for example, IBE, to cause the initial insulating layer to become the insulating layer 65. In this etching, the initial first layer 14P is etched in succession to the initial insulating layer.

Figure 30:
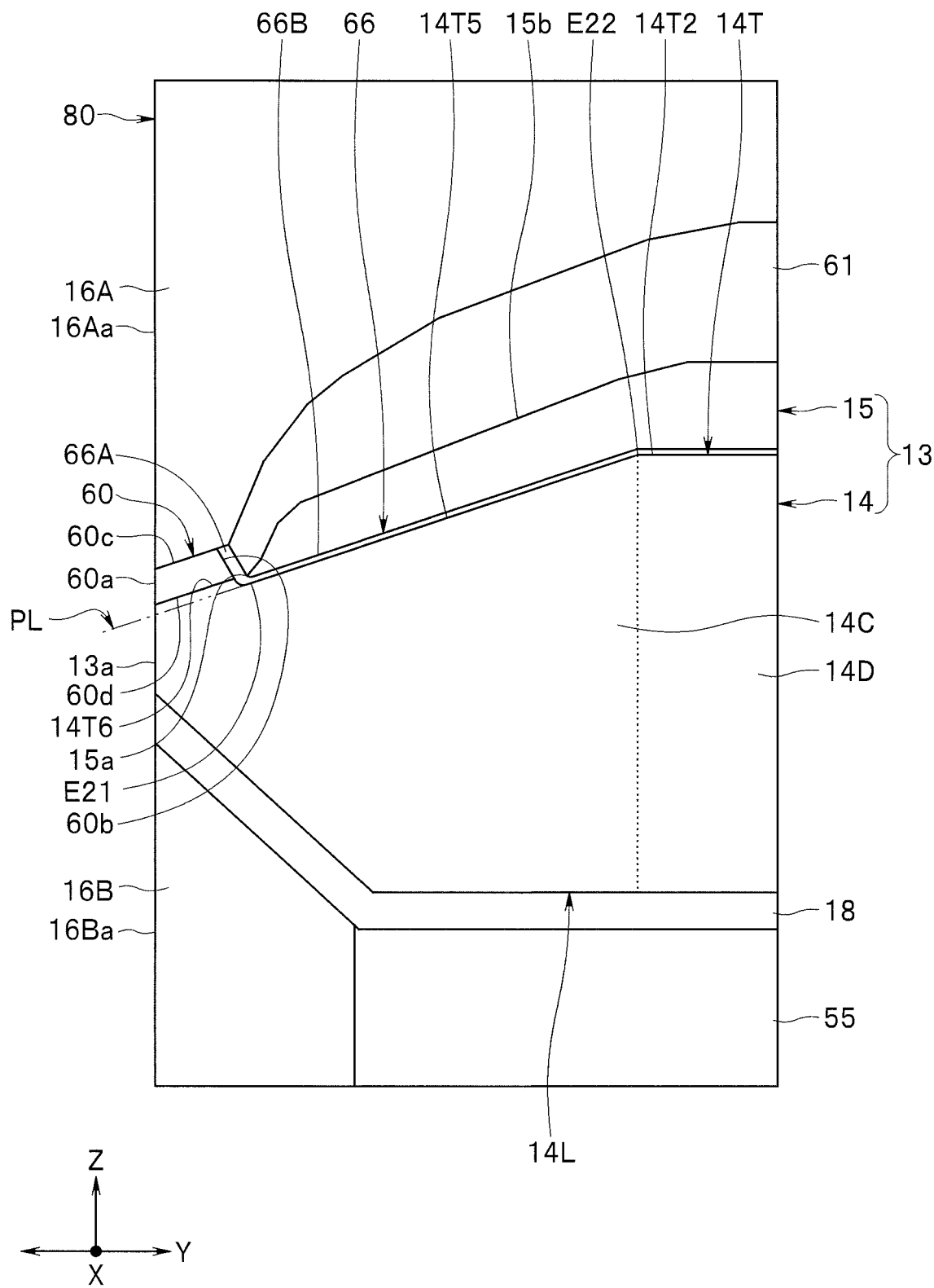
FIG. 30 is a cross-sectional view showing essential parts of a second modification example of the magnetic head according to the second embodiment of the invention.

Next, the second modification example will be described with reference to FIG. 30. FIG. 30 is a cross-sectional view showing essential parts of the second modification example of the magnetic head according to the present embodiment. In the second modification example, the top surface 14T of the first layer 14 of the main pole 13 includes an inclined portion 14T5 and a stepped portion 14T6 instead of the inclined portion 14T3 and the stepped portion 14T4. The inclined portion 14T5 is included in the thickness-changing portion 14C of the first layer 14. The inclined portion 14T5 has a rear end E22 located farthest from the medium facing surface 80, and a front end E21 located opposite to the rear end E22 in the inclined portion 14T5. The front end E21 is located at a distance from the medium facing surface 80. An entirety of the inclined portion 14T5 is inclined with respect to the medium facing surface 80 and a direction perpendicular to the medium facing surface 80 such that the rear end E22 is located farther from the top surface 1a of the substrate 1 than the front end E21. The flat portion 14T2 of the top surface 14T is connected to the rear end E22.

Assume here an imaginary plane PL including the inclined portion 14T5, as shown in FIG. 21. The stepped portion 14T6 protrudes from the imaginary plane PL in a direction away from the top surface 1a (see FIGS. 5 and 6) of the substrate 1. The stepped portion 14T6 has an end located on the medium facing surface 80. The spin torque oscillator 60 is disposed on the stepped portion 14T6.

In the second modification example, the magnetic head includes an insulating layer 66 of an insulating material, instead of the insulating layer 64. The insulating layer 66 is formed of the same material as the insulating layer 64, for example. The insulating layer 66 includes a first portion 66A disposed along the rear end face 60b of the spin torque oscillator 60, and a second portion 66B disposed along the inclined portion 14T5 and the flat portion 14T2 of the top surface 14T of the first layer 14 of the main pole 13. The dimension of the first portion 66A in a direction perpendicular to the rear end face 60*b*, i.e., the thickness of the first portion 66A falls within the range of 10 to 30 nm, for example. The dimension of the second portion 66B in a direction perpendicular to the inclined portion 14T5 or a direction perpendicular to the flat portion 14T2, i.e., the thickness of the second portion 66B falls within the range of 1 to 10 nm, for example.

In the second modification example, the second layer 15 of the main pole 13 is located on the second portion 66B of the insulating layer 66. Note that even if the second portion 66B of the insulating layer 66 is interposed between the first layer 14 and the second layer 15, the first layer 14 and the second layer 15 magnetically couple to each other.

Now, a method of forming the insulating layer 66 will be described briefly. The method of forming the insulating layer 66 is basically the same as the method of forming the insulating layer 65 of the first modification example. Specifically, the step of forming the insulating layer 66 includes the step of forming an initial insulating layer and the step of etching the initial insulating layer to cause the initial insulating layer to become the insulating layer 66. In the second modification example, the inclined portion 14T5 and the stepped portion 14T6 are formed in the initial first layer 14P by the patterning step that has been described with reference to FIG. 24. This makes the initial first layer 14P into the first layer 14. The step of forming the insulating layer 66 is performed after the first layer 14 is completed. In the second modification example, the step of etching the initial insulating layer etches the initial insulating layer such that neither of the inclined portion 14T5 and the flat portion 14T2 is exposed. This forms the first and second portions 66A and 66B of the insulating layer 66, thereby making the initial insulating layer into the insulating layer 66.

The magnetic head according to the present embodiment may include the first and second insulating layers 161 and 162 of the first embodiment shown in FIG. 19, instead of the insulating layer 61. The other configuration, function and effects of the present embodiment are similar to those of the first embodiment.

Third Embodiment

Figure 31:
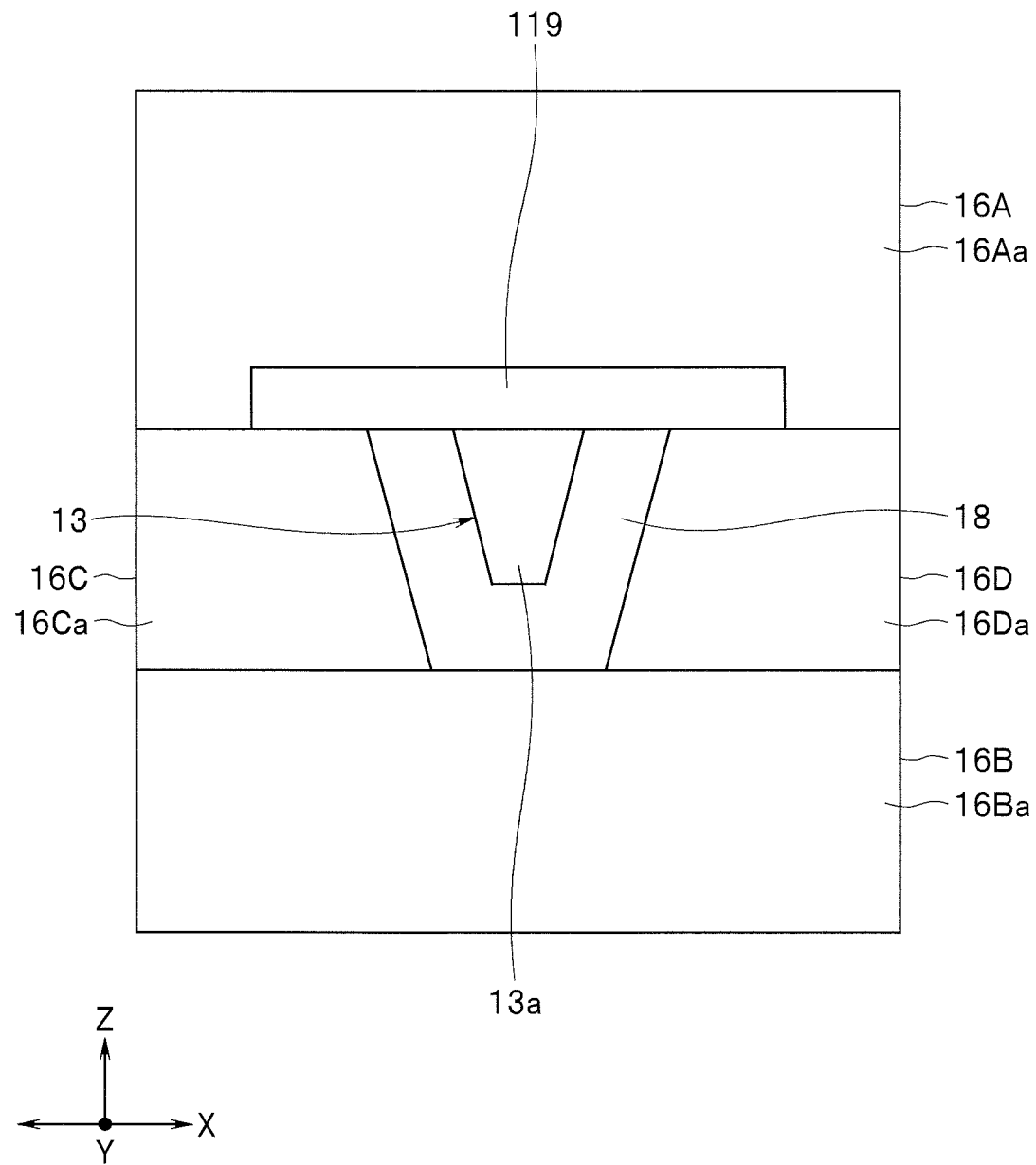
FIG. 31 is a front view showing essential parts of a magnetic head according to a third embodiment of the invention.
Figure 32:
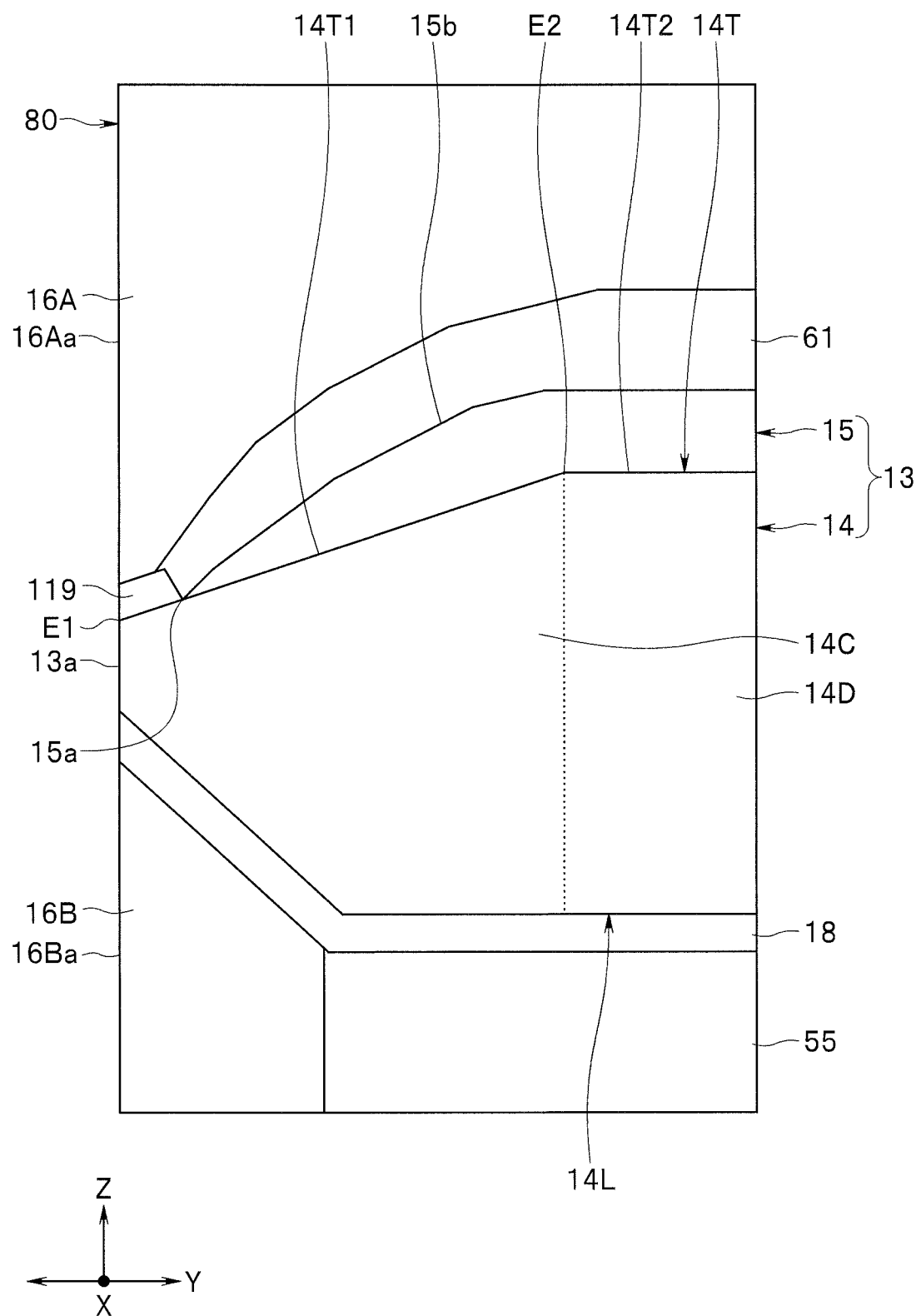
FIG. 32 is a cross-sectional view showing essential parts of the magnetic head according to the third embodiment of the invention.

A magnetic head according to a third embodiment of the invention will now be described with reference to FIG. 31 and FIG. 32. FIG. 31 is a front view showing essential parts of the magnetic head according to the present embodiment. FIG. 32 is a cross-sectional view showing essential parts of the magnetic head according to the present embodiment.

The magnetic head according to the present embodiment differs from the first embodiment in the following ways. In the present embodiment, the second gap layer 19 and the spin torque oscillator 60 of the first embodiment are omitted. Instead, the magnetic head according to the present embodiment includes a second gap layer 119 formed of a nonmagnetic material. For example, an insulating material such as alumina or silicon oxide is used as the nonmagnetic material for forming the second gap layer 119.

The second gap layer 119 is disposed on the top surface 14T of the first layer 14 of the main pole 13 at a position closer to the medium facing surface 80 than the end 15*a* of the second layer 15 of the main pole 15, specifically, on the inclined portion 14T1 of the top surface 14T of the first layer 14. The second gap layer 119 has an end located on the medium facing surface 80. The insulating layer 61 covers a portion of the top surface of the second layer 15 and a portion of the top surface of the second gap layer 119. An end of the insulating layer 61 that is located closest to the medium facing surface 80 is in contact with the top surface of the second gap layer 119.

In the present embodiment, the trailing shield 16A is disposed over the side shields 16C and 16D, the second gap layer 119 and the insulating layer 61, and in contact with the top surfaces of the side shields 16C and 16D, the second gap layer 119 and the insulating layer 61. On the medium facing surface 80, a portion of the front end face 16Aa of the trailing shield 16A is spaced from the end face 13*a* of the main pole 13 by a predetermined distance created by the thickness of the second gap layer 119.

A manufacturing method of the magnetic head according to the present embodiment will now be described briefly. The manufacturing method of the magnetic head according to the present embodiment includes neither of the step of forming the spin torque oscillator 60 and the step of forming the second gap layer 19 of the first embodiment. The step of forming the second gap layer 119 is performed after the step of forming the second layer 15. In the step of forming the second gap layer 119, first, a nonmagnetic film that is to become the second gap layer 119 later is formed on the stack including the main pole 13. Then, the nonmagnetic film except a portion located at a position where the medium facing surface 80 is to be formed is removed by etching. Next, the insulating layer 61 is formed. The nonmagnetic film is then selectively etched to cause the top surfaces of the side shields 16C and 16D to be exposed in part. This makes the nonmagnetic film into the second gap layer 119.

The magnetic head according to the present embodiment may include the first and second insulating layers 161 and 162 of the first embodiment shown in FIG. 19, instead of the insulating layer 61. The other configuration, function and effects of the present embodiment are similar to those of the first embodiment.

The present invention is not limited to the foregoing embodiments, and various modifications may be made thereto. As long as the requirements of the appended claims are met, the shapes and locations of the first layer 14 and the second layer 15 of the main pole 13 are not limited to the examples illustrated in the foregoing embodiments but can be freely chosen. For example, the first layer 14 may have a flat top surface that entirely extends in a direction substantially perpendicular to the medium facing surface 80, instead of the top surface 14T. In such a case, the second layer 15 is formed on the flat top surface of the first layer 14.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head comprising:
   a medium facing surface configured to face a recording medium;
   a coil configured to generate a magnetic field corresponding to data to be written on the recording medium;
   a main pole having an end face located on the medium facing surface, the main pole being configured to pass a magnetic flux corresponding to the magnetic field generated by the coil and to generate a write magnetic field for writing the data on the recording medium; and
   a substrate having a top surface, wherein
   the coil and the main pole are disposed over the top surface of the substrate, the main pole includes a first layer including the end face, and a second layer lying on the first layer, the first layer includes a thickness-changing portion whose dimension in a direction perpendicular to the top surface of the substrate decreases with decreasing distance to the medium facing surface, and at least part of the second layer is located on the thickness-changing portion.

2. The magnetic head according to claim 1, wherein the first layer has a top surface farthest from the top surface of the substrate, the second layer includes a front portion and a rear portion that extend along the top surface of the first layer in respective directions away from the medium facing surface, the rear portion is located farther from the medium facing surface than the front portion, a dimension of the front portion in a first direction orthogonal to the direction in which the front portion extends increases with increasing distance from the medium facing surface, and a maximum dimension of the rear portion in a second direction orthogonal to the direction in which the rear portion extends is greater than or equal to a maximum dimension of the front portion in the first direction.

3. The magnetic head according to claim 1, wherein the second layer has an end located closest to the medium facing surface and at a distance from the medium facing surface.

4. The magnetic head according to claim 3, wherein the first layer has a top surface farthest from the top surface of the substrate, the top surface of the first layer includes an inclined portion that is included in the thickness-changing portion of the first layer, the inclined portion has a rear end located farthest from the medium facing surface, and a front end located opposite to the rear end in the inclined portion, an entirety of the inclined portion is inclined with respect to the medium facing surface and a direction perpendicular to the medium facing surface such that the rear end is located farther from the top surface of the substrate than the front end, and the end of the second layer is located farther from the medium facing surface than the front end of the inclined portion and closer to the medium facing surface than the rear end of the inclined portion.

5. The magnetic head according to claim 3, further comprising:

a trailing shield formed of a magnetic material and having a front end face located on the medium facing surface at a position farther from the top surface of the substrate than the end face of the main pole; and a spin torque oscillator located between the main pole and the trailing shield and electrically connected to the main pole and the trailing shield, wherein the first layer has a top surface farthest from the top surface of the substrate, and at least part of the spin torque oscillator is located on the top surface of the first layer at a position closer to the medium facing surface than the end of the second layer.

6. The magnetic head according to claim 5, wherein the top surface of the first layer includes an inclined portion that is included in the thickness-changing portion of the first layer, the inclined portion has a rear end located farthest from the medium facing surface, and a front end located opposite to the rear end in the inclined portion, an entirety of the inclined portion is inclined with respect to the medium facing surface and a direction perpendicular to the medium facing surface such that the rear end is located farther from the top surface of the substrate than the front end, and the end of the second layer is located farther from the medium facing surface than the front end of the inclined portion and closer to the medium facing surface than the rear end of the inclined portion.

7. The magnetic head according to claim 6, wherein at least part of the spin torque oscillator is located on the inclined portion of the top surface of the first layer.

8. The magnetic head according to claim 6, wherein the top surface of the first layer further includes a stepped portion located closer to the medium facing surface than the inclined portion, the stepped portion protrudes from an imaginary plane including the inclined portion in a direction away from the top surface of the substrate, and the spin torque oscillator is disposed on the stepped portion.

9. The magnetic head according to claim 8, further comprising an insulating layer formed of an insulating material and interposed between the spin torque oscillator and the end of the second layer, wherein the stepped portion includes a first portion, and a second portion located farther from the medium facing surface than the first portion and closer to the imaginary plane than the first portion, the spin torque oscillator is disposed on the first portion, and the insulating layer is disposed on the second portion.

10. A manufacturing method of a magnetic head, the magnetic head including:

a medium facing surface configured to face a recording medium;

a coil configured to generate a magnetic field corresponding to data to be written on the recording medium;

a main pole having an end face located on the medium facing surface, the main pole being configured to pass a magnetic flux corresponding to the magnetic field generated by the coil and to generate a write magnetic field for writing the data on the recording medium; and a substrate having a top surface, wherein the coil and the main pole are disposed over the top surface of the substrate, the main pole includes a first layer including the end face, and a second layer lying on the first layer, the first layer includes a thickness-changing portion whose dimension in a direction perpendicular to the top surface of the substrate decreases with decreasing distance to the medium facing surface, and at least part of the second layer is located on the thickness-changing portion, the manufacturing method comprising the steps of:
forming the coil; and
forming the main pole, wherein the step of forming the main pole includes the steps of:
forming the first layer; and
forming the second layer such that at least part of the second layer is located on the thickness-changing portion.

11. The manufacturing method of the magnetic head according to claim 10, wherein the first layer has a top surface farthest from the top surface of the substrate, the second layer includes a front portion and a rear portion that extend along the top surface of the first layer in respective directions away from the medium facing surface, the rear portion is located farther from the medium facing surface than the front portion, a dimension of the front portion in a first direction orthogonal to the direction in which the front portion extends increases with increasing distance from the medium facing surface, a maximum dimension of the rear portion in a second direction orthogonal to the direction in which the rear portion extends is greater than or equal to a maximum dimension of the front portion in the first direction, and the step of forming the second layer includes the steps of:
forming a mask covering a portion near a position at which the medium facing surface is to be formed;
forming the second layer with the mask left intact; and
lifting off the mask after the second layer is formed.

12. The manufacturing method of the magnetic head according to claim 10, wherein the second layer has an end located closest to the medium facing surface and at a distance from the medium facing surface.

13. The manufacturing method of the magnetic head according to claim 12, wherein
the first layer has a top surface farthest from the top surface of the substrate,
the top surface of the first layer includes an inclined portion that is included in the thickness-changing portion,
the inclined portion has a rear end located farthest from the medium facing surface, and a front end located opposite to the rear end in the inclined portion,
an entirety of the inclined portion is inclined with respect to the medium facing surface and a direction perpendicular to the medium facing surface such that the rear end is located farther from the top surface of the substrate than the front end,
the end of the second layer is located farther from the medium facing surface than the front end of the inclined portion and closer to the medium facing surface than the rear end of the inclined portion,
the step of forming the first layer includes:
a step of forming an initial first layer that is to later become the first layer; and
an etching step of taper-etching the initial first layer to form the inclined portion in the initial first layer,
the initial first layer becomes the first layer upon formation of the inclined portion, and
the step of forming the second layer is performed after the etching step.

14. The manufacturing method of the magnetic head according to claim 12, wherein
the magnetic head further includes:
a trailing shield formed of a magnetic material and having a front end face located on the medium facing surface at a position farther from the top surface of the substrate than the end face of the main pole; and
a spin torque oscillator located between the main pole and the trailing shield and electrically connected to the main pole and the trailing shield,
the first layer has a top surface farthest from the top surface of the substrate, and
at least part of the spin torque oscillator is located on the top surface of the first layer at a position closer to the medium facing surface than the end of the second layer,
the manufacturing method further comprising the steps of:
forming the spin torque oscillator; and
forming the trailing shield after the spin torque oscillator is formed,
wherein the step of forming the spin torque oscillator includes:
a step of forming a layered film that is to later become the spin torque oscillator; and
a patterning step of patterning the layered film by etching to cause the layered film to become the spin torque oscillator.

15. The manufacturing method of the magnetic head according to claim 14, wherein
the top surface of the first layer includes an inclined portion that is included in the thickness-changing portion of the first layer,
the inclined portion has a rear end located farthest from the medium facing surface, and a front end located opposite to the rear end in the inclined portion,
an entirety of the inclined portion is inclined with respect to the medium facing surface and a direction perpendicular to the medium facing surface such that the rear end is located farther from the top surface of the substrate than the front end,
the end of the second layer is located farther from the medium facing surface than the front end of the inclined portion and closer to the medium facing surface than the rear end of the inclined portion,
the step of forming the first layer includes:
a step of forming an initial first layer that is to later become the first layer; and
an etching step of taper-etching the initial first layer to form an inclined surface corresponding to the inclined portion in the initial first layer, and
the step of forming the second layer is performed after the etching step.

16. The manufacturing method of the magnetic head according to claim 15, wherein
at least part of the spin torque oscillator is located on the inclined portion of the top surface of the first layer,
the etching step is a step of forming the inclined portion in the initial first layer,
the initial first layer becomes the first layer upon formation of the inclined portion,
the step of forming the spin torque oscillator is performed after the step of forming the second layer,
the second layer has a top surface farthest from the top surface of the substrate, and
the step of forming the layered film is a step of forming the layered film on the inclined portion and a top surface of the second layer.

17. The manufacturing method of the magnetic head according to claim 15, wherein
the top surface of the first layer further includes a stepped portion located closer to the medium facing surface than the inclined portion,
the stepped portion protrudes from an imaginary plane including the inclined portion in a direction away from the top surface of the substrate,
the spin torque oscillator is disposed on the stepped portion,
the step of forming the spin torque oscillator is performed after the etching step and before the step of forming the second layer,
the step of forming the layered film is a step of forming the layered film on the inclined surface formed by the etching step in the initial first layer, and the patterning step may be a step of patterning the layered film and etching the initial first layer in succession to the etching of the layered film to thereby form the stepped portion in the initial first layer.

18. The manufacturing method of the magnetic head according to claim 17, wherein the magnetic head further includes an insulating layer formed of an insulating material and interposed between the spin torque oscillator and the end of the second layer, the stepped portion includes a first portion, and a second portion located farther from the medium facing surface than the first portion and closer to the imaginary plane than the first portion, the spin torque oscillator is disposed on the first portion, the insulating layer is disposed on the second portion, the manufacturing method further comprises the step of forming the insulating layer after the step of forming the spin torque oscillator and before the step of forming the second layer, the step of forming the insulating layer includes the steps of:

forming an initial insulating layer of the insulating material; and etching the initial insulating layer to cause the initial insulating layer to become the insulating layer, the patterning step is a step of patterning the layered film and etching the initial first layer in succession to the etching of the layered film to thereby form the first portion of the stepped portion in the initial first layer, the step of etching the initial insulating layer is a step of etching the initial insulating layer and etching the initial first layer in succession to the etching of the initial insulating layer to thereby form the inclined portion and the second portion of the stepped portion in the initial first layer, and the initial first layer becomes the first layer upon formation of the inclined portion and the second portion of the stepped portion.

* * * * *